US006756972B2

United States Patent
Komatsu et al.

(10) Patent No.: US 6,756,972 B2
(45) Date of Patent: Jun. 29, 2004

(54) MANUALLY INPUT DATA DISPLAY SYSTEM

(75) Inventors: Yoshiaki Komatsu, Yokkaichi (JP); Kazunari Taki, Nagoya (JP); Tsuyoshi Ohashi, Hashima (JP); Takuya Nagai, Nagoya (JP); Yoshitsugu Tomomatsu, Nagoya (JP); Ryohei Komiya, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 442 days.

(21) Appl. No.: 09/816,418

(22) Filed: Mar. 26, 2001

(65) Prior Publication Data

US 2001/0035855 A1 Nov. 1, 2001

(30) Foreign Application Priority Data

Apr. 28, 2000 (JP) ........................................ 2000-130389
Apr. 28, 2000 (JP) ........................................ 2000-130390

(51) Int. Cl.[7] ................................................ G09G 5/08
(52) U.S. Cl. .................................... 345/173; 178/18.01
(58) Field of Search ................................. 345/156, 173, 345/1.1, 1.2, 2.1, 2.2, 2.3, 751, 753; 178/18.01, 19.01, 19.04, 18.03; 348/14.07, 14.08, 14.09

(56) References Cited

U.S. PATENT DOCUMENTS

| | | | |
|---|---|---|---|
| 5,136,125 A | | 8/1992 | Russell |
| 5,455,906 A | * | 10/1995 | Usuda ........................... 345/536 |
| 5,818,436 A | | 10/1998 | Imai et al. |
| 5,949,414 A | * | 9/1999 | Namikata et al. ............. 345/753 |
| 6,501,463 B1 | * | 12/2002 | Dahley et al. ................. 345/173 |
| 6,614,451 B1 | * | 9/2003 | Hudson et al. ................. 345/759 |

OTHER PUBLICATIONS

U.S. patent application Ser. No. 09/636,818, Okamoto et al., filed Aug. 10, 2000.
U.S. patent application Ser. No. 09/666,892, Wakayama et al., filed Sep. 20, 2000.
U.S. patent application Ser. No. 09/659,754, Tomomatsu, filed Sep. 11, 2000.
U.S. patent application Ser. No. 09/634,322, Nagai et al., filed Aug. 7, 2000.
U.S. patent application Ser. No. 09/628,724, Nagai et al., filed Jul. 28, 2000.

* cited by examiner

Primary Examiner—Chanh Nguyen
(74) Attorney, Agent, or Firm—Oliff & Berridge, PLC

(57) ABSTRACT

A stroke data input unit, of each of input display boards, transmits to a display unit coordinate data for characters or graphics obtained by an input board unit, by attaching identification (ID) information of the input board unit to the coordinate data. A synchronization display controller of the display unit displays the characters or graphics based on the coordinate data received through a receiver, and the ID information of the input display boards, in respective areas of a display panel. When a user makes a stepping display request, the synchronization display controller reads out the data stored in the stroke data storage unit to estimate an input time for strokes of the characters/graphics. The characters/graphics estimated to be input at approximately the same time in the input display boards, may be displayed in the respective areas of the display panel at approximately the same time. Further, when voting is conducted by inputting on a control panel a number assigned to each of the input boards to select a content displayed in any of individual display areas corresponding to the input boards, a display controller of a display server receives vote data from each of the input boards. A content which is displayed in an individual display area and polls the largest vote, is shifted to and displayed in a writing display area.

19 Claims, 36 Drawing Sheets

Related Art

US 6,756,972 B2

MANUALLY INPUT DATA DISPLAY SYSTEM

BACKGROUND OF THE INVENTION

1. Field of Invention

The invention relates to a manually input data display system, and a coordinate data input device and a display device for use in the manually input data display system.

2. Description of Related Art

FIG. 36 shows a conventional manually input data display system. For example, a presentation apparatus, including a personal computer (hereinafter referred to as the "PC") 1 and a display device 2 connected to each other, is provided in each of conference rooms. The PCs 1 in each of the conference rooms may conduct communications therebetween through, for example, a telephone line. The display device 2 may include, for example, a projector 3, and a display board 4 provided with a pressure-sensitive touch sensor.

When a conference is held using remotely located conference rooms, the PC 1 is operated in any of the conference rooms, so as to throw an image of data, which is stored in the PC 1 or an external memory, onto the display board 4, using the projector 3. The same data is transmitted to the PCs 1 provided in other conference rooms, through the telephone line, so that the same contents may be displayed on the display board 4 in every room. With the above-described structures, participants in each of the conference rooms can hold a meeting while seeing the display board 4, with the same contents presented in each room.

For example, when a participant writes a character or a graphic on a surface of the display board 4, using a writing implement 5 to provide some additional information to the contents currently presented on the display board 4, a pressure applied during writing is sensed by the pressure-sensitive touch sensor, thereby obtaining coordinate data for the input. The coordinate data is transmitted to the PC 1. Also, the coordinate data is transmitted to other PCs 1 provided in the conference rooms, through the telephone line.

In the above-described conventional presentation apparatus, the image of the characters/graphics is thrown by the projector 3 onto the display board 4 on which the characters/graphics may be written. When the additional information is written on the display board 4 where the image of the characters/graphics has already been displayed thereon, it becomes difficult to recognize the contents on the display board 4. In addition, when the image of the characters/graphics added to the display board 4 of a different conference room is overlaid on the image of the characters/graphics thrown by the projector 3 onto the display board 4 of a conference room, it is difficult to understand which contents are written by whom or in which rooms.

SUMMARY OF THE INVENTION

Accordingly, one exemplary aspect of the invention is to provide a manually input data display system, and a coordinate data input device and a display device for use in the manually input data display system, in which data, such as text and graphics manually input by a user, is displayed in an easy-to-see arrangement.

A manually input data display system of the invention may include a plurality of coordinate data input devices and at least one display device. Each of the coordinate data input devices may include a coordinate data acquisition unit that obtains images manually input from the coordinate data input devices as coordinate data, a coordinate controller that controls processing of the coordinate data obtained by the coordinate data acquisition unit, and a transmitter that transmits the coordinate data. The display device may include a receiver that receives the coordinate data transmitted from the plurality of the coordinate data input devices, a display controller that controls processing of the coordinate data received through the receiver, and a display unit that displays the manually input images based on the coordinate data. The display controller of the display device may divide a display area of the display unit into a plurality of individual display areas corresponding to the plurality of coordinate data input devices, and a selective display area that selectively displays the images displayed in the individual display areas.

In the manually input data display system, when a user sees the display unit, the user may easily understand from which coordinate data input device (by which participants) contents displayed in each of the individual display areas are input. Among the contents displayed in the individual display areas, a particular content may be selected and displayed in the selective display area. With the above-described structure, main points in a conference may be easily organized.

The coordinate controller of each of the coordinate data input devices may transmit the coordinate data obtained by the coordinate data acquisition unit, with an identification information of each of the coordinate data input devices attached to the coordinate data. The display controller of the display device may identify the identification information attached to the coordinate data received through the receiver, and display the images input in each of the coordinate data input devices on the corresponding individual display areas, based on the coordinate data. When it is determined that the images displayed in the individual display areas satisfy a predetermined condition, the display controller of the display device may shift the images displayed in the individual display areas to the selective display area.

The display controller of the display device may display the images in the individual display areas corresponding to the coordinate data input devices, by identifying the identification information attached to the coordinate data. When the predetermined condition is satisfied, the display controller of the display device may shift the images displayed in the individual display areas to the selective display area, so that the images are displayed in the selective display area The display controller of the display device may determine, based on the identification information attached to the coordinate data, whether the images corresponding to the coordinate data are to be displayed in the display unit.

When a conference or meeting is held between people in remotely located conference rooms, the display device provided in each of the conference rooms may display the images input by the participants in the other rooms. Such structures may be employed when the need to display the images input on one of the coordinate data input devices in a room, on the display device in the same room, is relatively low. Thus, a display area of the display device may be effectively used.

Each of the coordinate data input devices may further include a designation unit that designates the images displayed in any of the individual display areas. When the display controller of the display device receives data designating the images selected by the designation unit from any of the coordinate data input devices, through the receiver, the display controller of the display device determines that the designated images displayed in the individual display areas satisfy the predetermined condition.

When the user performs a designation operation using the designation unit, the images displayed in the individual display areas may be shifted to the selective display area, while reflecting the user's intentions.

Each of the coordinate data input devices may further include a designation unit that designates the images displayed in any of the individual display areas. When the display controller of the display device receives data designating the images selected by the designation unit of at least one of the coordinate data input devices, through the receiver, the display controller determines that the images displayed in one of the individual display areas, which is designated the most important, satisfies the predetermined condition.

When the users designate, on the designation unit, the images displayed in the individual display areas that the users think are to be selected, the images displayed on one of the individual display areas, which obtains the largest number of designations, may be shifted to the selective display area. Thus, the images may be shifted to and displayed in the selective display area, based on the intentions of the users.

Each of the coordinate data input devices may further include a temporary storage device that temporarily stores the coordinate data obtained by the coordinate acquisition unit, and an erasing unit that performs an erasing operation to erase the coordinate data stored in the temporary storage device. The coordinate controller of each of the coordinate input devices may transmit the coordinate data stored in the temporary storage device to the display device, through the transmitter, when the images manually input by the user are entirely erased by the erasing unit.

When the images manually input by the users from the coordinate data input devices are entirely erased, the coordinate data for the images is automatically transmitted to the display device. With the structures, the users do not have to intentionally perform any operations to transmit the coordinate data.

In the manually input data display system of the invention, when the images displayed in the individual display areas are selectively shifted to the selective display area, the display controller of the display device may display the identification information of the coordinate input devices corresponding to the individual display areas, together with the images to be shifted to the selective display area.

The display controller of the display device may display the identification information of the coordinate data input devices corresponding to the individual display areas, together with the images to be shifted to the selective display area, when the images displayed in the individual display areas are selectively shifted to the selective display area. Consequently, the user may easily understand in which coordinate data input devices the images shifted to and displayed in the selective display area are originally input.

Each of the coordinate data input devices may further include an information input unit that inputs displayable information by an operation of the user. The coordinate controller of each of the coordinate data input devices may add the displayable information input by the information input unit, to the identification information.

The coordinate controller of each of the coordinate data input devices may add the displayable information input by the information input unit, to the identification information. For example, when the user inputs the name thereof as the displayable information, the name may be displayed together with the images to be shifted to and displayed in the selective display area. Therefore, it may be easily understood by whom the images displayed in the selective display area are input.

When the images displayed in the individual display areas are selectively shifted to the selective display area, the display controller of the display device may display serial numbers together with the images to be shifted to the selective display area.

The display controller of the display device may attach the serial numbers to the images when the images displayed in the individual display areas are shifted to and displayed in the selective display area. Therefore, for example, the user may designate one of the serial numbers attached to the images displayed in the selective display area.

Each of the coordinate data input devices may further include a heading designation unit that designates a heading for the images to be displayed in the selective display area. As the display controller of the display device receives data designating the heading designated by the heading designation unit, through the receiver, the display controller may display the heading together with the images when the images displayed in the individual display areas are selectively shifted to the selective display area.

When the images displayed in the individual display areas are shifted to the selective display area, the display controller of the display device may display designated headings or titles, such as "idea", "proposal", "problem", and "solution", as the data designating the heading is received from the heading designation unit.

The display controller of the display device may predetermine a number of the individual display areas according to a number of the coordinate data input devices connected to the transmitter.

The display controller of the display device may predetermine the number of the individual display areas according to the number of the coordinate data input devices that are connected to the transmitter. Therefore, the individual display areas may be provided in the display unit for all of the coordinate data input devices that will transmit the data to the display device.

The display controller of the display device may determine a number of the individual display areas according to a number of the coordinate data input devices that actually transmit the coordinate data among the coordinate data input devices connected to the transmitter.

Since the display controller of the display device determines the number of the individual display areas according to the number of the coordinate data input devices that actually transmit the coordinate data among the coordinate data input devices connected to the transmitter, the display area of the display unit may be effectively used.

In the manually input data display system of the invention, the display controller of the display device may stack the individual display areas in the display unit, to overlap the individual display areas. One of the individual display areas corresponding to one of the coordinate data input device that most recently transmits the coordinate data is placed on the top.

When a relatively large number of the coordinate data input device are used and the relatively large number of individual display areas need to be provided in the display unit, the individual display areas may be provided in overlapping windows. The images based on the coordinate data that is most recently transmitted from one of the coordinate data input devices, may be displayed on the top of the corresponding individual display areas. Therefore, the images based on the coordinate data that is most recently input in one of the coordinate data input devices may be viewed.

According to another exemplary aspect of the invention, a manually input data display system of the invention may include a plurality of coordinate data input devices and at least one display device. Each of the coordinate data input devices may include a coordinate data acquisition unit that obtains images manually input from the coordinate data input device as coordinate data, a coordinate controller that controls processing of the coordinate data obtained by the coordinate data acquisition unit, and a transmitter that transmits the coordinate data. The display device may include a receiver that receives the coordinate data transmitted from the plurality of the coordinate data input devices, a display controller that controls processing of the coordinate data received through the receiver, and a display unit that displays the manually input images based on the coordinate data. The coordinate controller of each of the coordinate data input devices transmits the coordinate data obtained by the coordinate data acquisition unit by attaching an identification information of each of the coordinate data input devices to the coordinate data. The display controller of the display device displays the images based on the coordinate data received through the receiver and the identification information attached to the coordinate data in the display unit.

In the manually input data display system, for example, when one of participants of a conference manually inputs characters/graphics in the coordinate data input device, the coordinate data for characters/graphics is transmitted to the display unit together with the identification information of the coordinate data input device. The characters/graphics input in the coordinate data input device may be displayed in the display unit, together with the identification information of the coordinate data input device. The participants may easily understand who inputs the contents displayed in the display unit or from which coordinate data input devices the contents are input, as the participants see the identification information displayed in the display unit. Even when the conference is held between people in remotely located rooms, the manually input data display system of the invention develops the mutual understanding between the participants.

The display controller of the display device may determine, based on the ID information, from which coordinate data input device the coordinate data is transmitted. With the structure, the display area in the display device may be divided according to the coordinate data input devices. Thus, the display in the display device may preferably be organized in an easy-to-see manner for users.

The display device may further include a storage unit that stores the coordinate data in association with the identification information of one of the plurality of the coordinate data input devices from which the coordinate data was transmitted. The display controller of the display device stores in the storage unit the coordinate data in association with the identification information, reads the identification information in association with the coordinate data stored in the storage unit to divide a display area of the display unit into a plurality of areas, and displays the images input from the coordinate data input devices simultaneously in each of the divided areas of the display unit.

The display controller of the display device may further include an estimation unit that estimates whether the images corresponding to the coordinate data received through the receiver, are input approximately at a same time from the coordinate data input devices, and simultaneously displays the images estimated to be input approximately at the same time from the coordinate data input devices, based on a result of estimation by the estimation unit.

The coordinate controller of each of the coordinate input devices may transmit the coordinate data obtained by the coordinate data acquisition unit by attaching input time data for the images to the coordinate data. The display controller of the display device may store, in the storage unit, the coordinate data attaching the input time data thereto and received through the receiver, in association with the input time data. The estimation unit may estimate an input time of the images corresponding to the coordinate data by reading the input time data in association with the coordinate data stored in the storage unit.

The estimation unit may estimate, based on an amount of change in at least one of X coordinate and Y coordinate of the coordinate data transmitted from each of the coordinate data input devices, the input time of the images corresponding to the coordinate data.

The display controller of the display device sequentially may display the images estimated to be input approximately at the same time, in each of the areas of the display unit, every time a display request is made.

The display controller of the display device may divide the display area of the display unit, according to variations of the identification information transmitted from each of the coordinate data input devices.

BRIEF DESCRIPTION OF THE DRAWINGS

Preferred exemplary embodiments of the invention will be described in detail with reference to the following figures wherein.

Further objects, details, and advantages of the invention will be apparent from the following detailed description, when read in conjunction with the drawings.

DETAILED DESCRIPTION OF PREFERRED EMBODIMENTS

Figure 1:
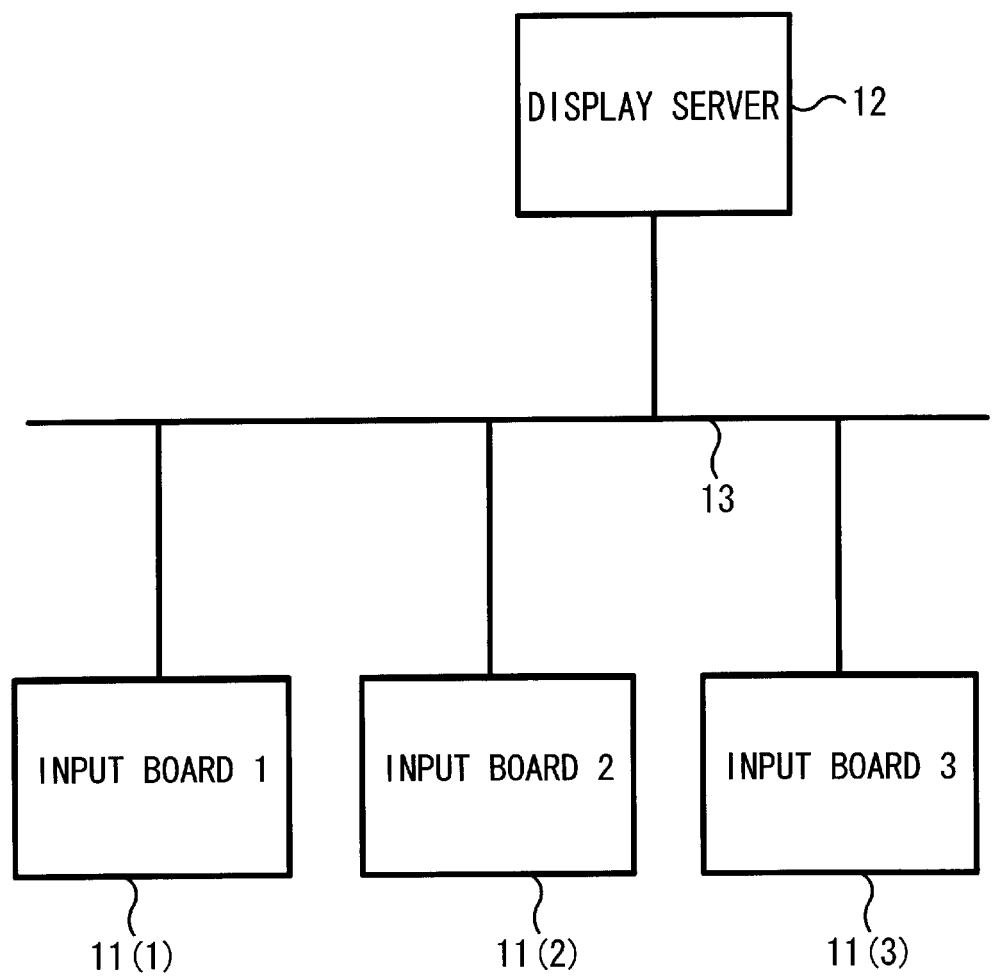
FIG. 1 is a block diagram of a manually input data display system according to a first exemplary embodiment of the invention.
Figure 2:
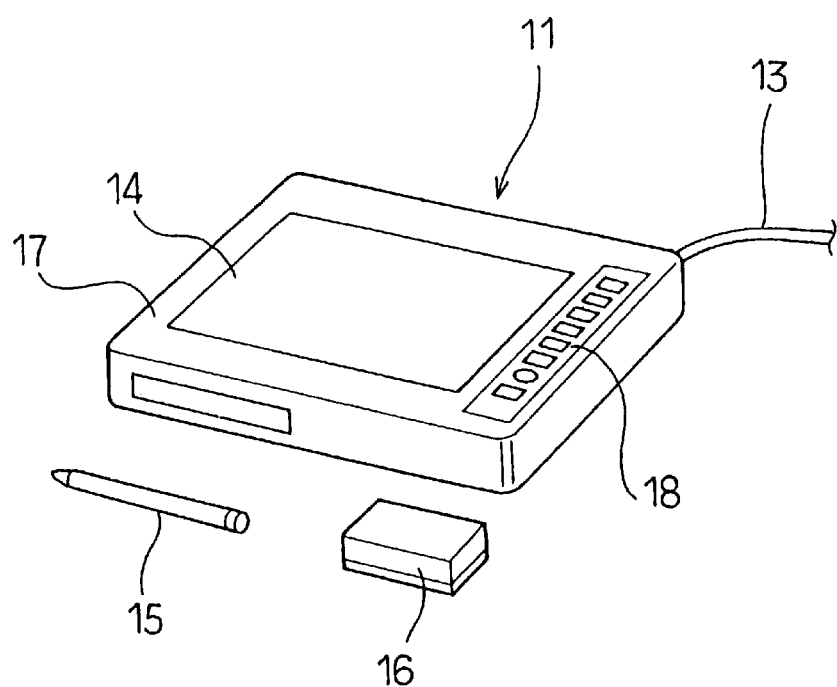
FIG. 2 is a perspective view of an input board.

A first exemplary embodiment of the invention will be described with reference to FIGS. 1 to 11. FIG. 1 illustrate structures of a manually input data display system. As shown in FIG. 1, each of input boards 11(1), 11(2), 11(3) is structured to electrically read characters/graphics manually written on a writing sheet, as coordinate data and transmit the coordinate data, to an external device. A display server 12 displays the characters/graphics, based on the coordinate data read by the input boards 11(1) to 11(3).

The input boards 11(1) to 11(3) and the display server 12 are connected to each other, through a communication line 13 (e.g., a local-area network/LAN and a telephone line). For example, the input boards 11(1) to 11(3) are disposed on a table in a conference room, so that each of participants of a conference or a meeting keeps the input boards 11(1) to 11(3) on hand. Each participant may see the display server 12 during the conference.

Structures of the input board 11 and a pen 15 are disclosed in detail in U.S. Pat. No. 5,136,125, U.S. patent application Nos. 09/636,818, 09/666,892, 09/659,754, 09/628,724, 09/634,322, of which disclosures are incorporated herein by reference. However, the structures thereof will be briefly described below, with reference to FIGS. 2 and 3. A user may write characters/graphics on a writing surface of a writing panel 14, using the pen 15 on the input board 11. The characters/graphics written on the writing surface of the writing panel 14 may be erased using an eraser 16. The writing panel 14 is built into a case-like frame 17. On a side of the frame 17, a control panel 18 is provided.

Figure 3:
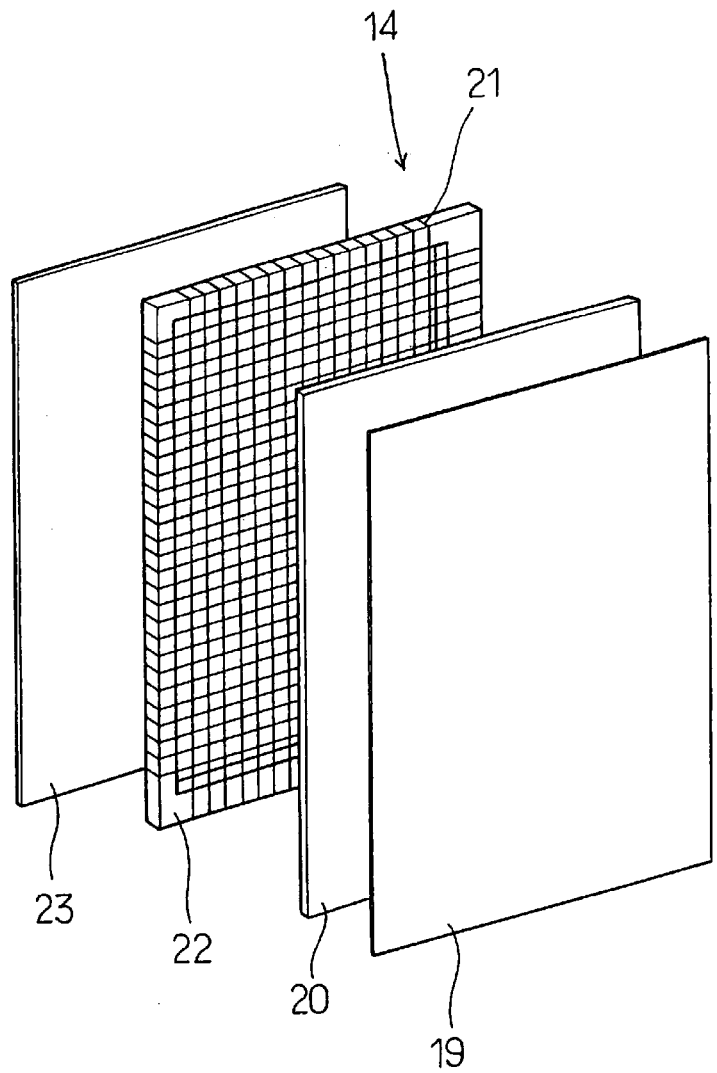
FIG. 3 is an exploded view of a writing panel.

As shown in FIG. 3, the writing panel 14 includes a writing sheet 19 formed of, for example, polyethylene terephthalate (PET), a plate panel 20, an attachment panel 22 laying a sense coil 21 thereon, and a plate-like back panel 23, which are all laminated together in this order as shown in FIG. 3. The sense coil 21 includes an X-coil that senses an X coordinate and a Y-coil that senses a Y coordinate when the user moves the pen 15 or the eraser 16 on the writing sheet 19. A plurality of the X-coils and the Y-coils are arranged on the attachment panel 22, in a direction perpendicular to each other. The X-coils, each having a width, overlap one another with a pitch P/2 (half the width P). In the same way, the Y-coils, each having a width P, overlap one another with a pitch P/2.

Figure 4:
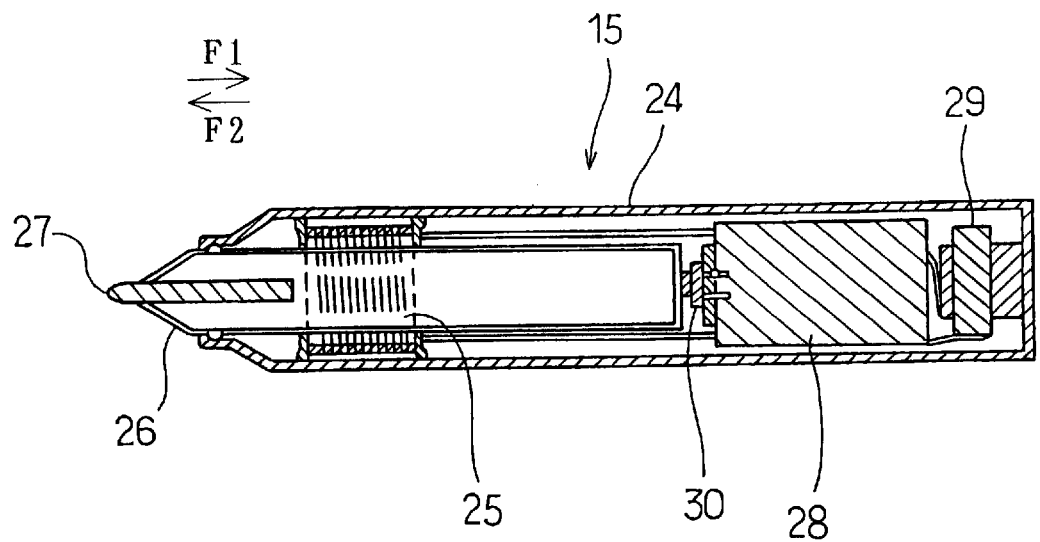
FIG. 4 is a vertical sectional view illustrating an internal structure of a pen.

FIG. 4 is a vertical sectional view illustrating an internal structure of the pen 15. The pen 15 includes a cylindrical-shaped casing 24, a coil 25, an ink cartridge 26 disposed in the casing 24 and removable in the direction indicated by the arrow F2 in FIG. 4, a pen tip 27 inserted into the ink cartridge 26, a circuit board 28 including an oscillation circuit that generates an alternating magnetic field from the coil 25, and a battery 29 that supplies power to the circuit board 28.

Disposed between the ink cartridge 26 and the circuit board 28 is a push-button switch 30 used for a power supply to the oscillation circuit. The switch 30 is turned on when the pen tip 27 is pushed onto the writing sheet 19 and moves in the direction indicated by the arrow F1. When the pen 15 is used for writing, the alternating magnetic field is generated from the coil 25.

The circuit board 28 includes an oscillation circuit that outputs a signal (modulated wave) whose frequency is predetermined according to the attributes of the pen 15 (such as a color of ink stored in the ink cartridge 26), another oscillation circuit that outputs a carrier wave, and a frequency shift keying (FSK) modulation circuit that modulates a frequency of the carrier wave using the frequency of the modulated wave. For example, the frequency of the carrier wave is approximately 410 kHz. The frequency of the modulated wave for the pen 15, containing the black ink, may be set to approximately 4.1 kHz. Similarly, the eraser 16 includes a coil and an oscillation circuit for generating the alternating magnetic field and a battery, although the detailed illustration thereof is omitted herein.

Figure 5:
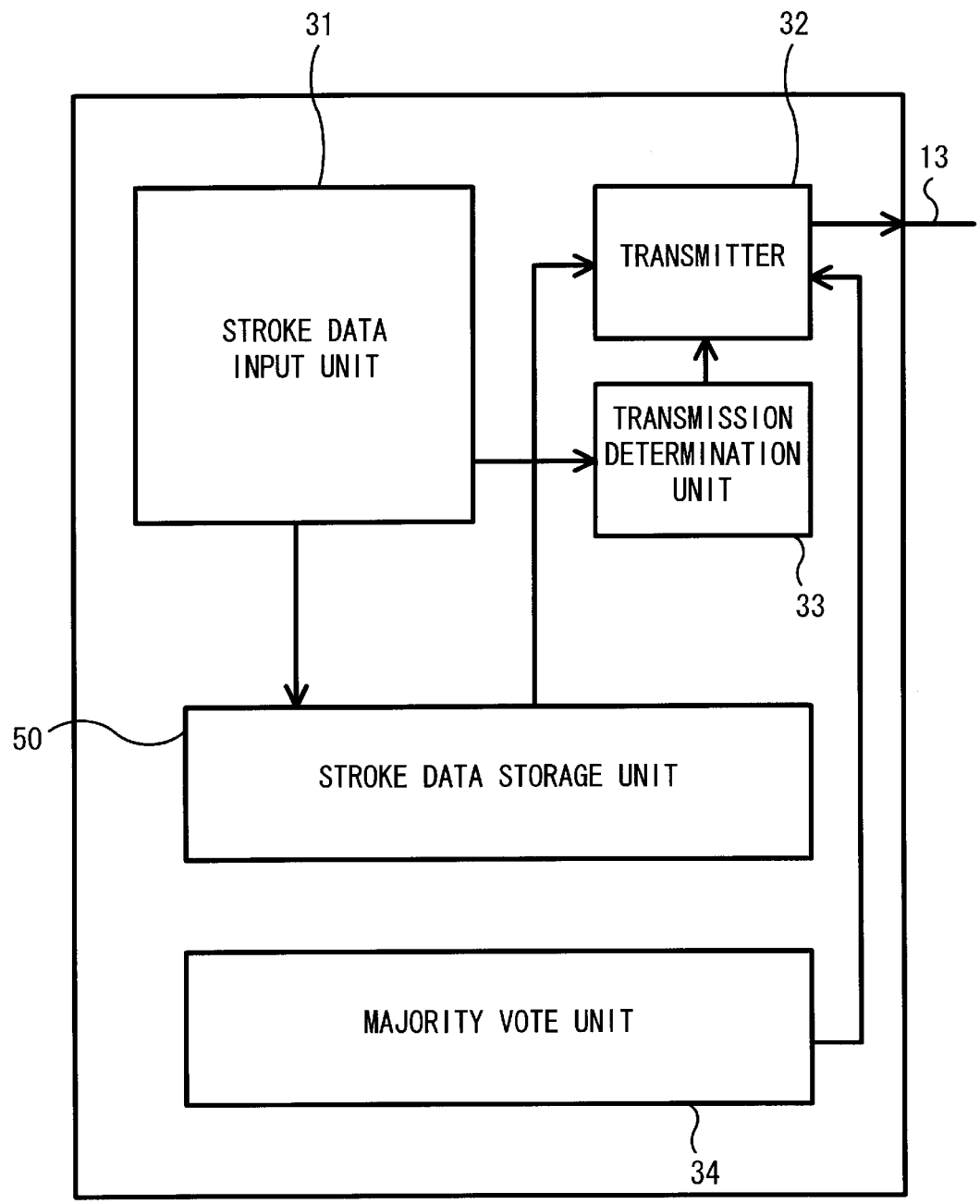
FIG. 5 is a block diagram illustrating an electrical configuration of the input board.

FIG. 5 shows an electrical configuration of the input board 11. A stroke data input unit 31 includes a memory such as a central processing unit (CPU), a read-only memory (ROM), and a random-access memory (RAM), a multiplexor that selects signals output from the coil 21, an amplifier that amplifies signals, an A/D converter, a FSK demodulation circuit, and a real time clock (RTC) IC that obtains time data. A stroke data storage unit 50 is a buffer that temporarily stores the coordinate data input to the stroke data input unit 31.

A transmitter 32 is a communication interface for transmitting the coordinate data stored in the stroke data storage unit 50, to other input boards 11, through the communication line 13. A transmission decision unit 33 gives data transmission permission to the transmitter 32, as it is detected, via the stroke data input unit 31, that the eraser 16 entirely erases the path of the pen 15 shown in ink on the surface of the writing sheet 19, after the user manually inputs data on the writing panel 14.

A majority vote unit 34 is now briefly described and is explained in more detail below. When the user would like to select, for example, an opinion displayed on the display server 12 to which the user thinks attention needs to be given, the user may input on the control panel 18 a number assigned to the input board 11 on which the opinion is manually input. The majority vote unit 34 transmits the number input on the control panel 18 as a vote data, to the display server 12, via the transmitter 21.

Figure 6:
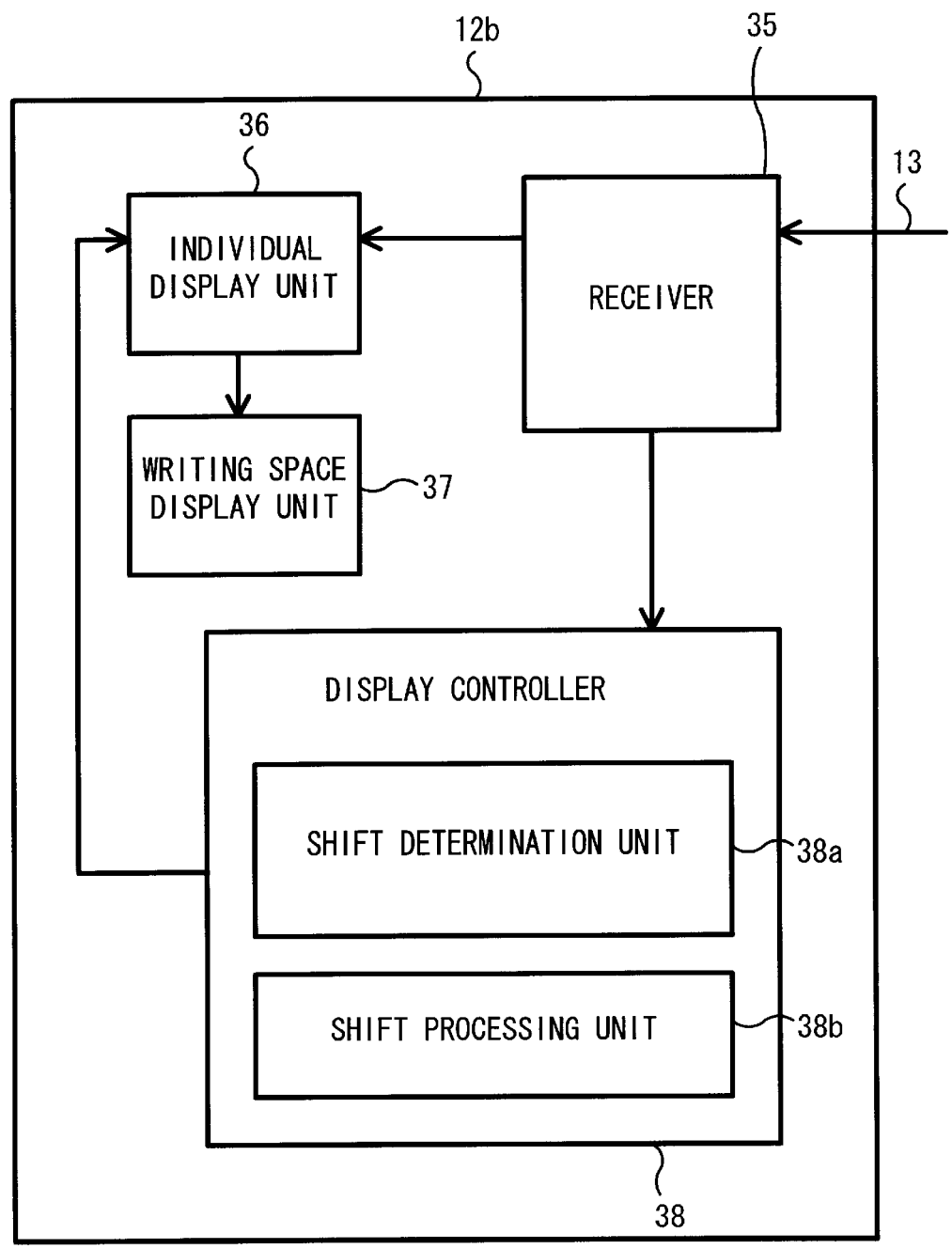
FIG. 6 is a block diagram illustrating an electrical configuration of a display server.

The display server 12 includes a display panel 12a (see FIG. 11) and a display body 12b (see FIG. 6). For example, a personal computer may be used for the display server 12. FIG. 6 is a block diagram illustrating an electrical configuration of the display body 12b. Upon the reception of data transmitted from each of the input boards 11(1) to 11(3), through the communication line 13, a receiver 35 stores the data in an individual display unit 36.

The individual display unit 36 includes buffers provided for the coordinate data in correspondence with each of the input boards 11(1) to 11(3). The individual display unit 36 displays the characters/graphics based on the data stored in the buffer, in relative individual display areas 39 (see FIG. 11) of the display panel 12a. The data stored in the individual display unit 36 is transferred to a writing space display unit 37, under the control of a display controller 38. Based on the data transferred to the writing space display unit 37, the characters/graphics are displayed in a writing display area 40 (see FIG. 11) of the display panel 12a.

The display controller 38 includes a shift determination unit 38a and a shift processing unit 38b. The shift determination unit 38a receives the vote data transmitted from the majority vote unit 34 of the input board 11 and determines the input board 11 which polls the largest vote. The shift processing unit 38b transfers the data from the individual display unit 36 to the writing space display unit 37, based on the results of the processing in the shift determination unit 38a.

Figure 7:
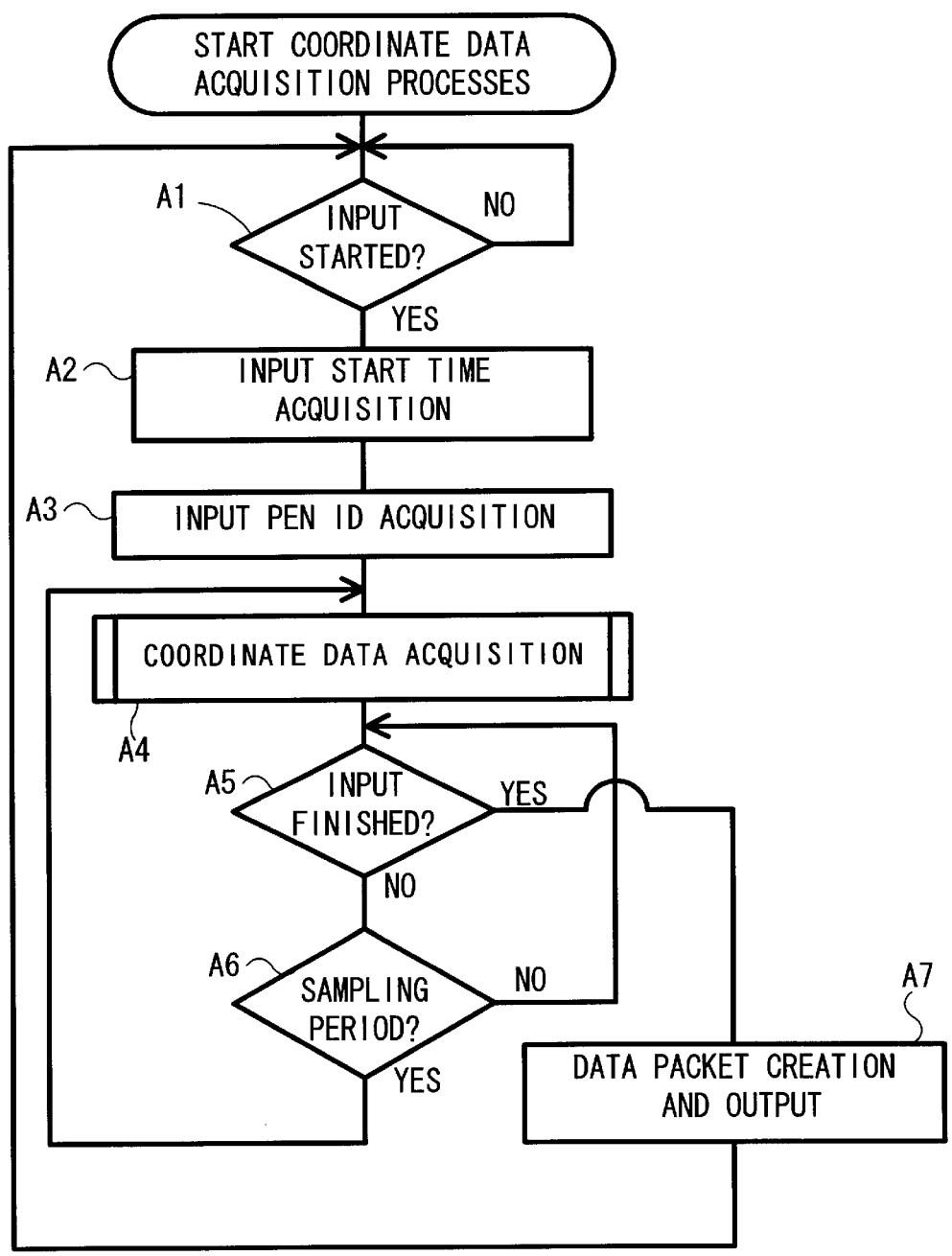
FIG. 7 is a flowchart of processes performed by a stroke data input unit according to the first exemplary embodiment through a seventh exemplary embodiment.

Processing performed by the manually input data display system according to the first exemplary embodiment will be described below, with reference to FIGS. 7 to 11. FIG. 7 is a flowchart of coordinate data acquisition processes performed by the stroke data input unit 31 when the user draws characters/graphics using the pen 15 on the writing sheet 19 in the input board 11. As described above, when the user pushes the pen tip 27 of the pen 15 onto the writing sheet 19, the switch 30 provided inside of the pen 15 is turned on, so that the alternating magnetic field (FSK modulated signal) is generated from the coil 25.

When the stroke data input unit 31 determines, by the detection of the alternating magnetic field, that a manual input is started (step A1: YES), the input start time data (time stamp) is obtained by the RTC IC (in step A2). Thereafter, an identification (ID) of the pen 15 is obtained, based on the demodulation level of the FSK modulated signal transmitted from the pen 15 (in step A3). The coordinate data for a start point of the input are then obtained (in step A4).

Figure 8A:
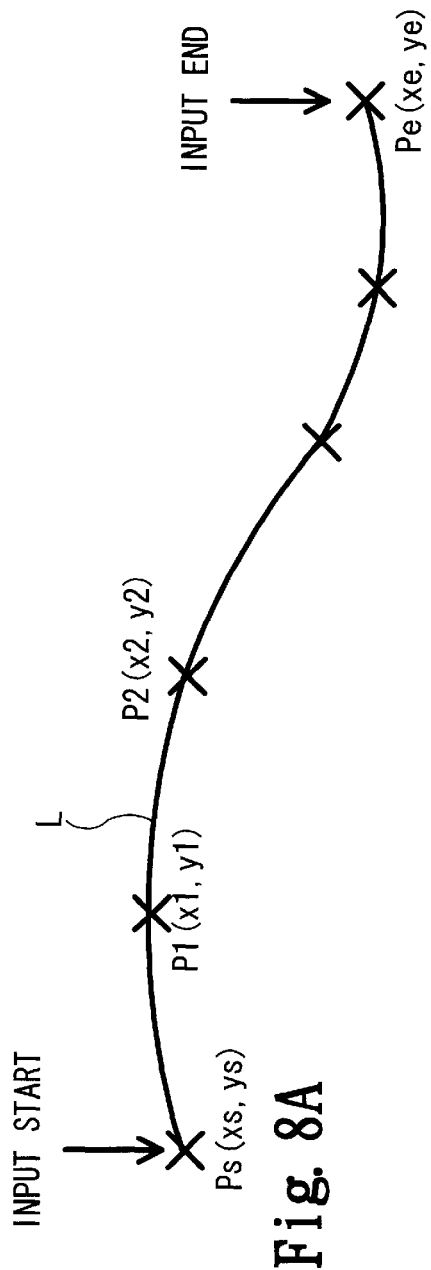
FIG. 8A is a schematic illustrating an example of coordinate data for one stroke obtained when a user draws a line L in the input board.

The coordinate data acquisition will be briefly explained below. FIG. 8A is a schematic illustrating an example of coordinate data obtained for such a series of actions (one stroke) that the user puts the pen 15 on a point Ps on the writing sheet 19 in the input board 11 and moves the pen 15 off at a point Pe, drawing a line L.

As the alternating magnetic field generated from the coil 25 of the pen 15 is magnetically coupled to the coil 21 in the input board 11, a voltage signal is induced to the coil 21. The stroke data input unit 31 of the input board 11 sequentially reads levels of the voltage signals induced on the X-coils of the coil 21 (X1, X2, ..., Xm), by A/D converting the signals. The voltage signal levels are stored in the memory. The X coordinate is determined by the point on the X-coil which shows the highest voltage signal level. Similarly, the stroke data input unit 31 sequentially reads levels of the voltage signals induced on the Y-coils of the coil 21 (Y1, Y2, ..., Yn), by A/D converting the signals. The Y coordinate is determined by the point on the Y-coil which shows the highest voltage signal level. Thus, a set of the X and Y coordinates data is obtained.

When the coordinate data (xs, ys) for the input start point Ps is obtained as described above, the stroke data input unit 31 determines whether the manual input is finished (in step A5). More specifically, when the user moves the pen tip 27 of the pen 15 off the writing sheet 19, the switch 30 inside the pen 15 is turned off, stopping the output of the alternating magnetic field. By the detection of the alternating magnetic field, it is determined whether the manual input is finished. When it is determined that the manual input has not yet finished (step A5: NO), the stroke data input unit 31 waits until the next sampling period comes. When the next sampling period comes (step A6: YES), the flow returns to step A4 to obtain next coordinate data (x1, y1).

As shown in FIG. 8A, as the coordinate data for the points Ps, P1, P2, and so on, is sequentially obtained and it is determined that manual input is finished at the point Pe (step A5: YES), the point Pe is set to the input end point. A line starting from the input start point Ps and ending at the input end point Pe corresponds to one stroke. For example, when a letter "A" is written and manually input, the letter "A" generally ends with three strokes.

The stroke data input unit 31 generates a data packet including the ID of the input board 11 (input board ID), the attributes (ID) of the pen 15, and the input start time data attached to the start of the coordinate data for one stroke. The data packet is output to the data stroke storage unit 50 (in step A7). Thereafter, the flow returns to step A1 and the stroke data input unit 31 waits for the input of the next stroke.

Figure 9:
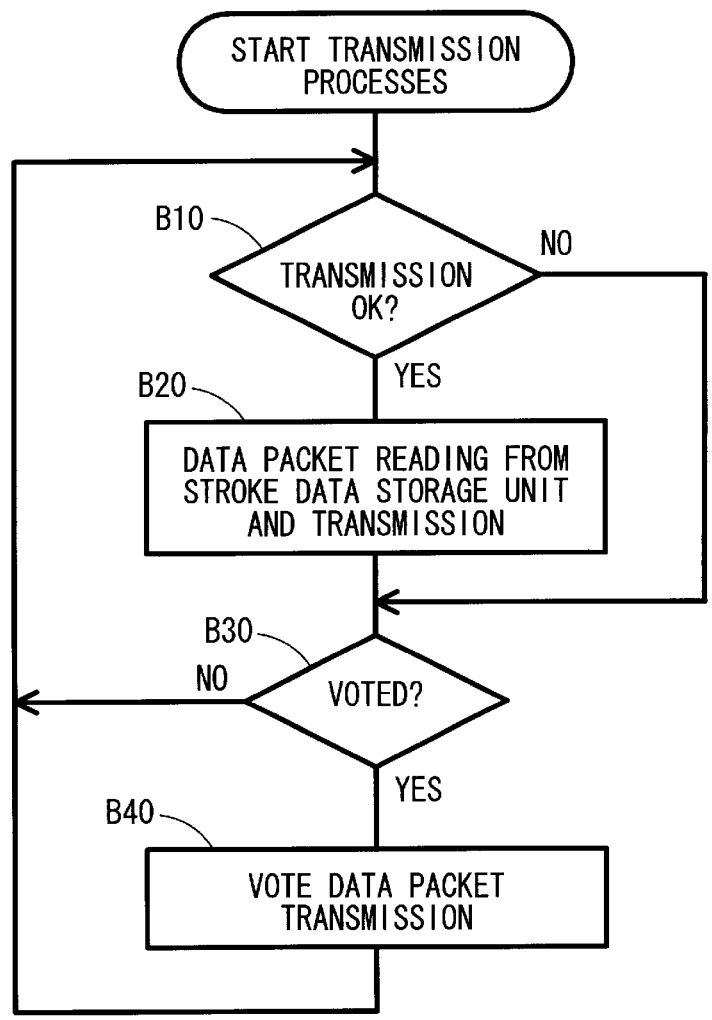
FIG. 9 is a flowchart illustrating transmission processes performed by the input board.

FIG. 9 is a flowchart illustrating transmission processes performed by the transmitter 32. The transmitter 32 determines whether the data transmission permission is given by the transmission decision unit 33 (in step B10). As described above, when it is detected that the path of the manual input on the writing sheet 19 is entirely erased by the eraser 16, the data transmission permission is given to the transmitter 32.

The eraser 16 transmits an ID code to the stroke data input unit 31 using the FSK modulated signal, similar to the pen 15, so that the stroke data input unit 31 can determine that the eraser 16 is used. As the stroke data input unit 31 detects that the path of the manual input on the writing sheet 19, is entirely erased by the eraser 16, a signal indicating that the erasing process is performed is transmitted to the transmission decision unit 33. Upon the reception of the signal, the transmission decision unit 33 gives the transmitter 32 the data transmission permission.

When it is determined that the data transmission is permitted (step B10: YES), the data packet stored in the stroke data storage unit 50 is read and transmitted to the display server 12 (in step B20). Thereafter, the transmitter 32 determines that the majority vote unit 34 is initiated by a vote made by the user on the control panel 18 (in step B30). When the data transmission permission is not given in step B10 (step B10: NO), the flow proceeds to step B30.

As described above, when the user would like to select a content displayed on the display panel 12a of the display server 12 to which the user thinks attention needs to be given, voting is conducted, by inputting on the control panel 18, a number assigned to the input board 11 on which the content is manually input. If the voting is conducted, the majority vote unit 34 creates a vote data packet including the vote data (selected input board ID) to which the ID of the selecting input board 11 is attached. The vote data packet is transmitted to the transmitter 32. When the transmitter 32 determines that voting is conducted in step B30 (step B30: YES), the transmitter 32 transmits the vote data packet to the display server 12 (in step B40). Thereafter, flow returns to step B10.

Figure 10:
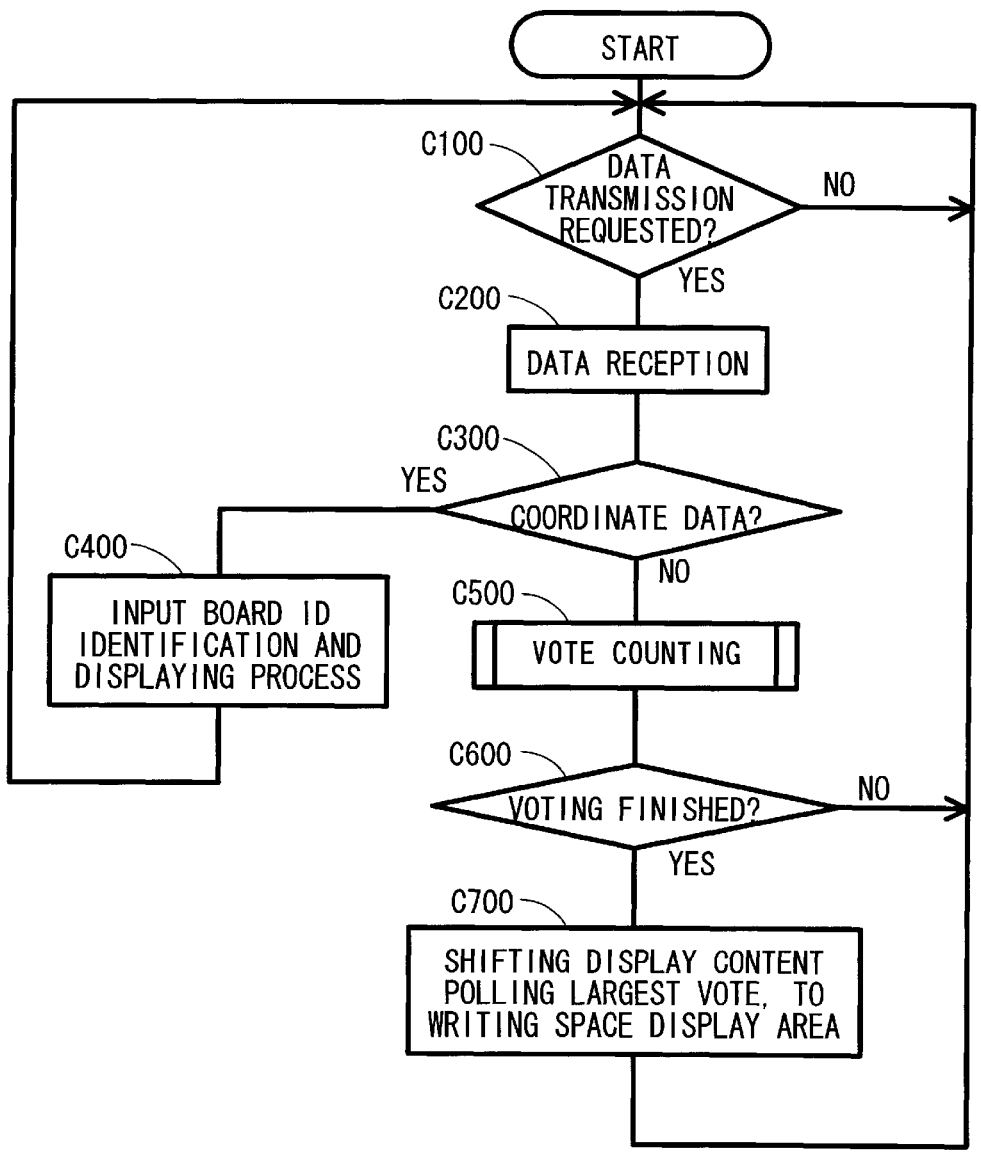
FIG. 10 is a flowchart illustrating processes performed by the display sever.

FIG. 10 is a flowchart illustrating processes performed by the display server 12. The receiver 35 waits until the data transmission is requested by any of the input boards 11(1) to 11(3) (in step C100). When the data transmission is requested (step C100: YES), the receiver 35 receives the data (in step C200). Then, it is determined whether the received data is the coordinate data (in step C300). When it is determined that the received data is the coordinate data (step C300: YES), the input board ID attached to the received data, is identified. Based on the identified ID of the input board 11, the coordinate data is output to the buffer of the individual display unit 36 corresponding to the input board 11. The characters/graphics based on the coordinate data is displayed in the individual display area 39 (see FIG. 11) of the display panel 12a (in step C400).

Based on the coordinate data for the strokes, the characters/graphics are displayed by providing a line between two points, for example, points Ps and P1, and points P1 and P2, in FIG. 8A.

When it is determined in step C300, that the received data is not the coordinate data (step C300: NO), the received data is the vote data. The shift determination unit 38a performs a vote counting process (step C500). The vote counting process is performed to determine the majority vote, by counting the input board IDs indicated in the vote data. Then, it is determined whether voting is finished (in step C600). Determination as to whether the voting is finished, may be made by such a manner that, for example, a predetermined time has elapsed from a point of time, and the votes are received from all the input boards 11 connected through the communication line 13. When it is determined that the voting is not finished (step C600: NO), flow returns to step C100. When it is determined that the voting is finished (step C600: YES), flow proceeds to step C700.

In step C700, as a result of the vote counting performed by the shift determination unit 38a, the coordinate data for the manual input in the input board 11, which polls the largest vote, is shifted from the individual display unit 36 to the writing space display unit 37. The writing space display unit 37 shifts the content displayed in the individual display area 39 corresponding to the input board 11, which polls the largest vote, to the writing display area 40, so that the content may be displayed in the writing display area 40, based on the coordinate data shifted from the individual display unit 36 to the writing space display unit 37. To the content shifted to and displayed in the writing display area 40, the relative input board ID is attached. Then, flow returns to step C100.

Figure 11:
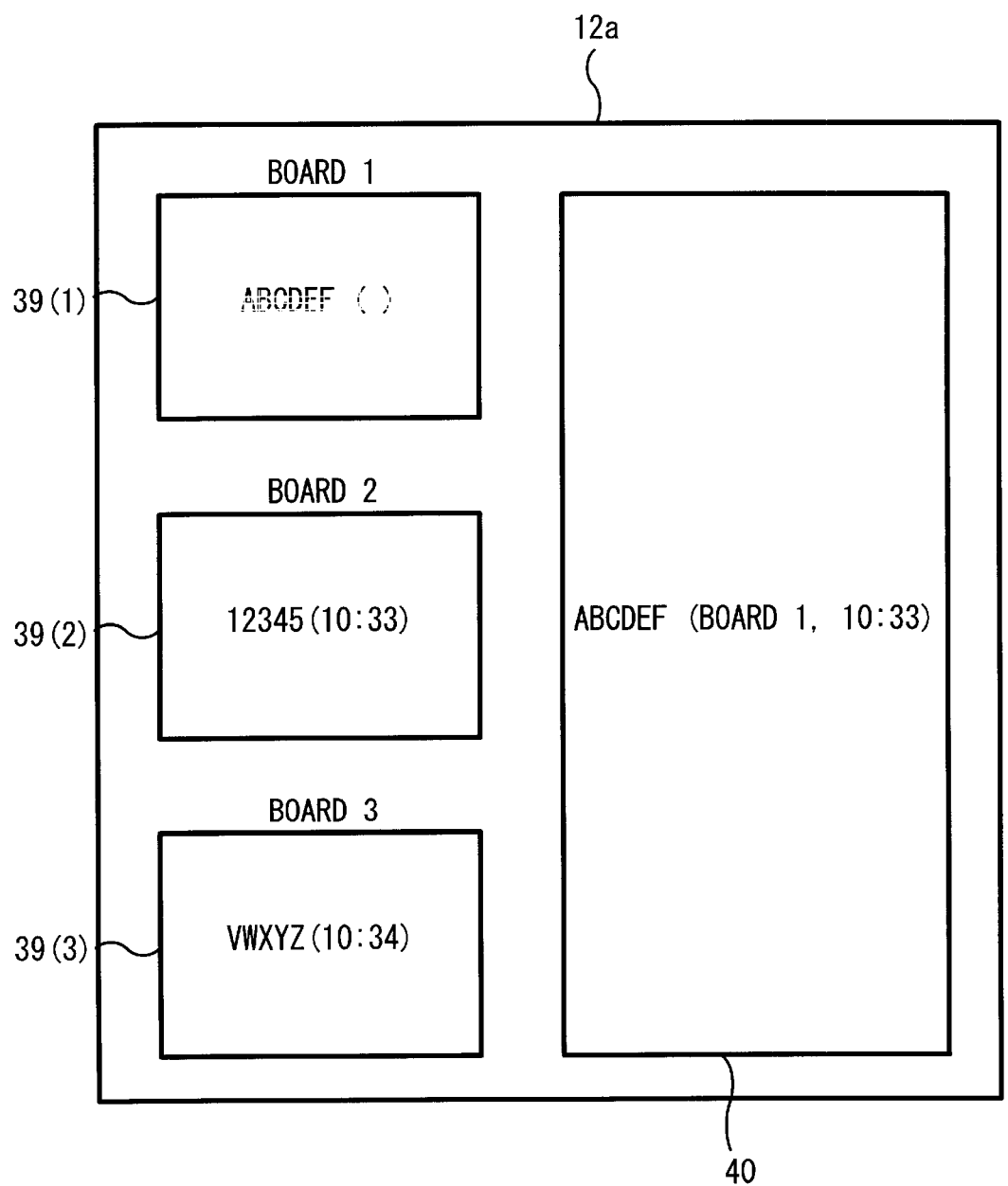
FIG. 11 is a schematic illustrating displaying examples on a display panel.

For example, the display panel 12a is provided with the individual display areas 39(1), 39(2), 39(3) corresponding to the input board 11(1), 11(2), 11(3), respectively, and one writing display area 40, as shown in FIG. 11. In this case, each of the individual display areas 39(1), 39(2), 39(3) indicates such as "BOARD 1", "BOARD 2", and "BOARD 3", so that people who see the display panel 12a can easily recognize in which input board 11 the displayed contents are input. The individual display areas 39(1), 39(2), 39(3) display characters "ABCDEF", "12345", and "VWXYZ", respectively, that are manually input in each of the input boards 11(1),11(2),11(3).

The display controller 38 displays the input start time at the end of the display content. FIG. 1 shows that characters "ABCDEF" and "12345" are both started to be input at 10:33, and "VWXYZ" is started to be input at 10:34.

It is assumed that the opinion input in the input board 11(1) is determined as the best one, as a result of voting by the users of each of the input boards 11(1) to 11(3) (decision by a majority vote). Accordingly, the characters "ABCDEF", displayed in the individual display area 39(1) relative to the input board 11(1), is shifted to and displayed in the writing display area 40. Following the characters "ABCDEF", the ID of the input board 11 (1) is indicated as "BOARD 1".

FIG. 11 illustrates the characters "ABCDEF" displayed in the individual display area 39(1) by the dotted lines to show that "ABCDEF" are shifted to the writing display area 40. However, the characters "ABCDEF" may continuously be displayed in the individual display area 39(1) even after "ABCDEF" are shifted to the writing display area 40. The characters "ABCDEF" may be deleted from the individual display area 39(1) after "ABCDEF" are shifted to the writing display area 40. The characters "ABCDEF" may be displayed in the individual display area 39(1) in a decorative manner, for example, using a font or a color different from that used for the contents displayed in the other individual display areas 39(2), 39(3).

In the above-described first exemplary embodiment, the display controller 38 of the display server 12 divides the display area of the display panel 12a into a plurality of the individual display areas 39 corresponding to a plurality of the input boards 11, and the writing display area 40 that selectively displays the contents displayed in the individual display area 39. When a plurality of participates join a conference or meeting, for example, opinions manually input on the input boards 11 by each of the participants are displayed in the corresponding individual display areas 39. Therefore, when the participants see the display panel 12a, the participants can easily understand by which input boards 11 (whom) the opinions are input.

Voting is conducted by inputting on the control panel 18 a number assigned to the input board 11 whose relative individual display area 39 displays a content to which the user thinks attention needs to be given. When voting is conducted, the display controller 38 receives the vote data from each of the input boards 11. Thereafter, a content which is displayed in the individual display area 39 and polls the largest vote, is shifted to and displayed in the writing display area 40, while reflecting the user's intentions.

Further, in the above-described first exemplary embodiment, the coordinate data obtained by the stroke data input unit 31 in the input board 11 is temporarily stored in the stroke data storage unit 50. As the manually input data on the writing panel 19 is entirely erased by the eraser 16, the coordinate data stored in the stroke data storage unit 50 is transmitted to the display server 12. Without the user's operation to transmit the coordinate data, the coordinate data is automatically transmitted to the display server 12, for example, when the previously manually input data is erased to input the next data. Consequently, the characters/graphics based on the coordinate data is displayed.

The display controller 38 determines the number of the individual display areas 39, according to the number of the input boards 11 that actually transmit the coordinate data. Therefore, the display area of the display panel 12a can be effectively used. In addition, when the characters/graphics are shifted to and displayed in the writing display area 40, the display controller 38 displays the characters/graphics together with the ID of the input board 11 relative to the individual display area 39. Therefore, the user can easily understand that the content shifted to and displayed in the writing display area 40 is input by which input board 11. Further, the stroke data input unit 31 transmits the obtained coordinate data together with the input start time data. The display controller 38 also displays the input start time. Accordingly, the participants can clearly understand how much time has elapsed since the data was initially manually input.

Figure 12:
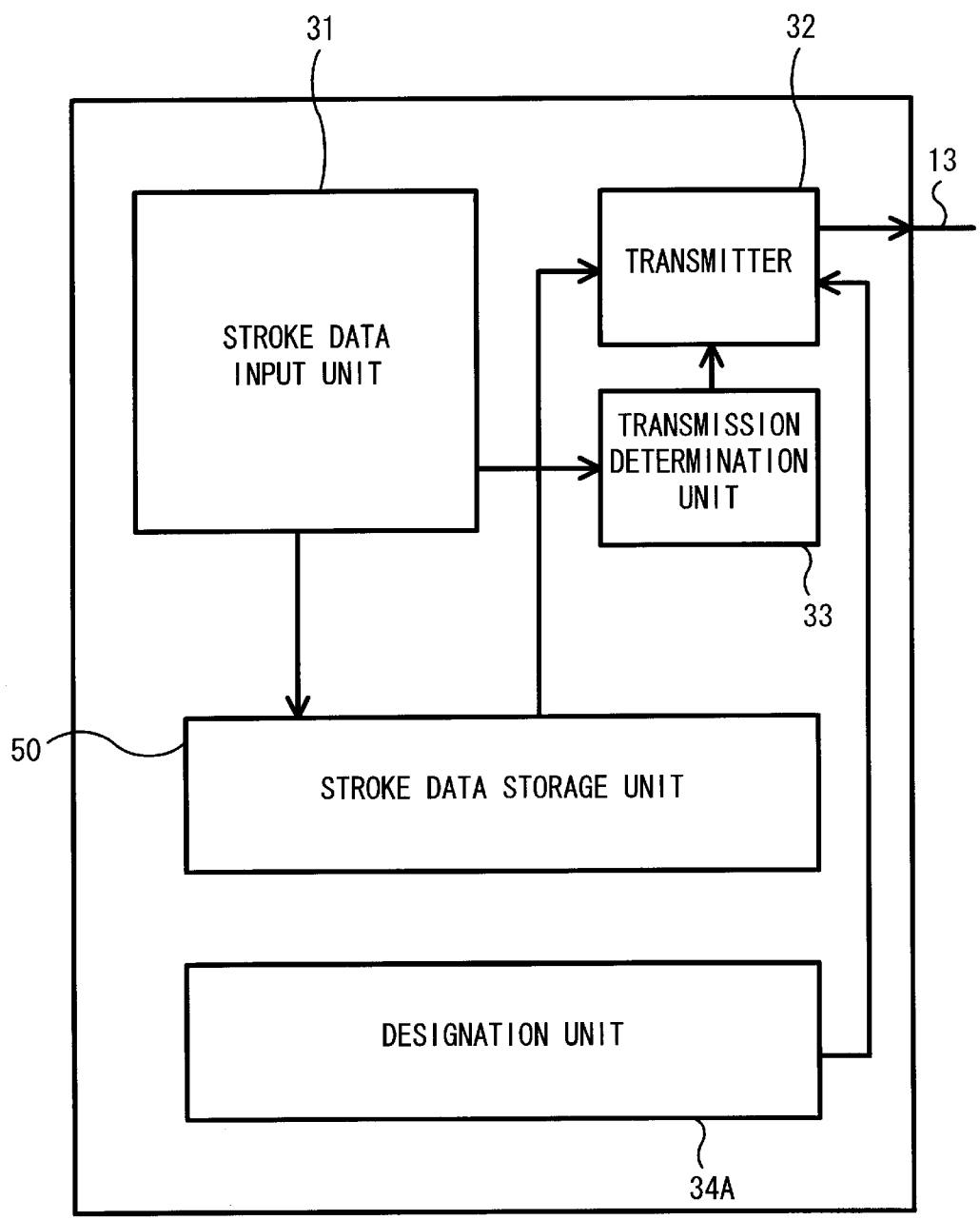
FIG. 12 is a block diagram illustrating an electrical configuration of the input board according to a second exemplary embodiment of the invention.
Figure 13:
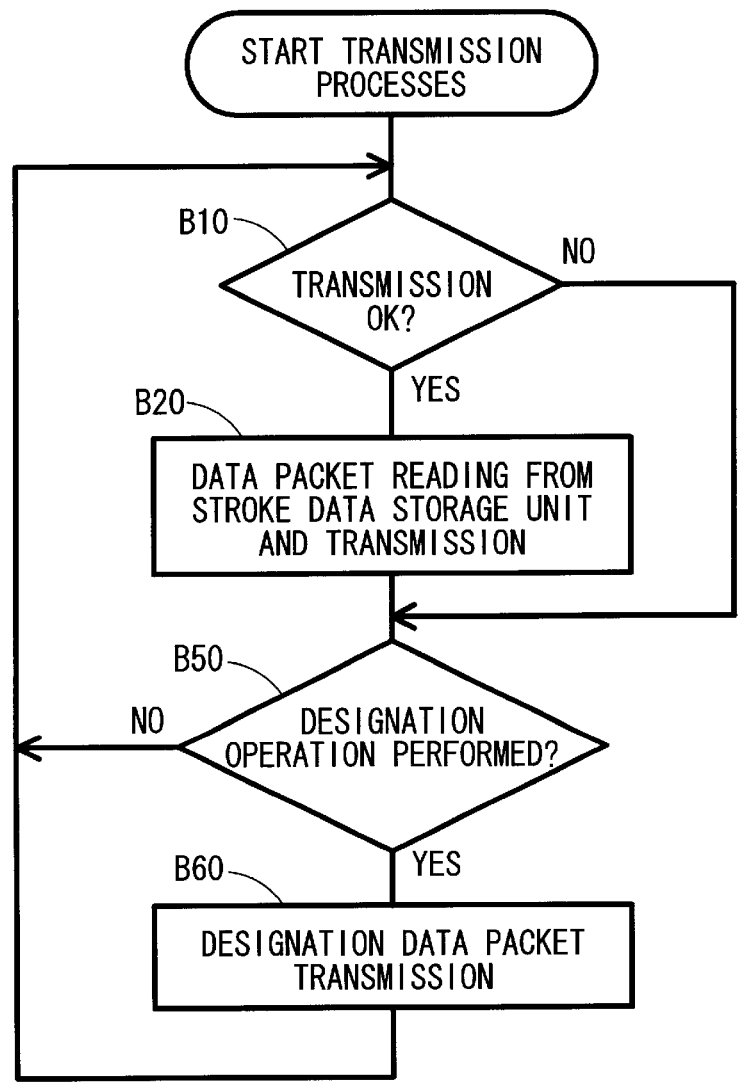
FIG. 13 is a flowchart illustrating transmission processes performed by the input board according to the second exemplary embodiment of the invention.
Figure 14:
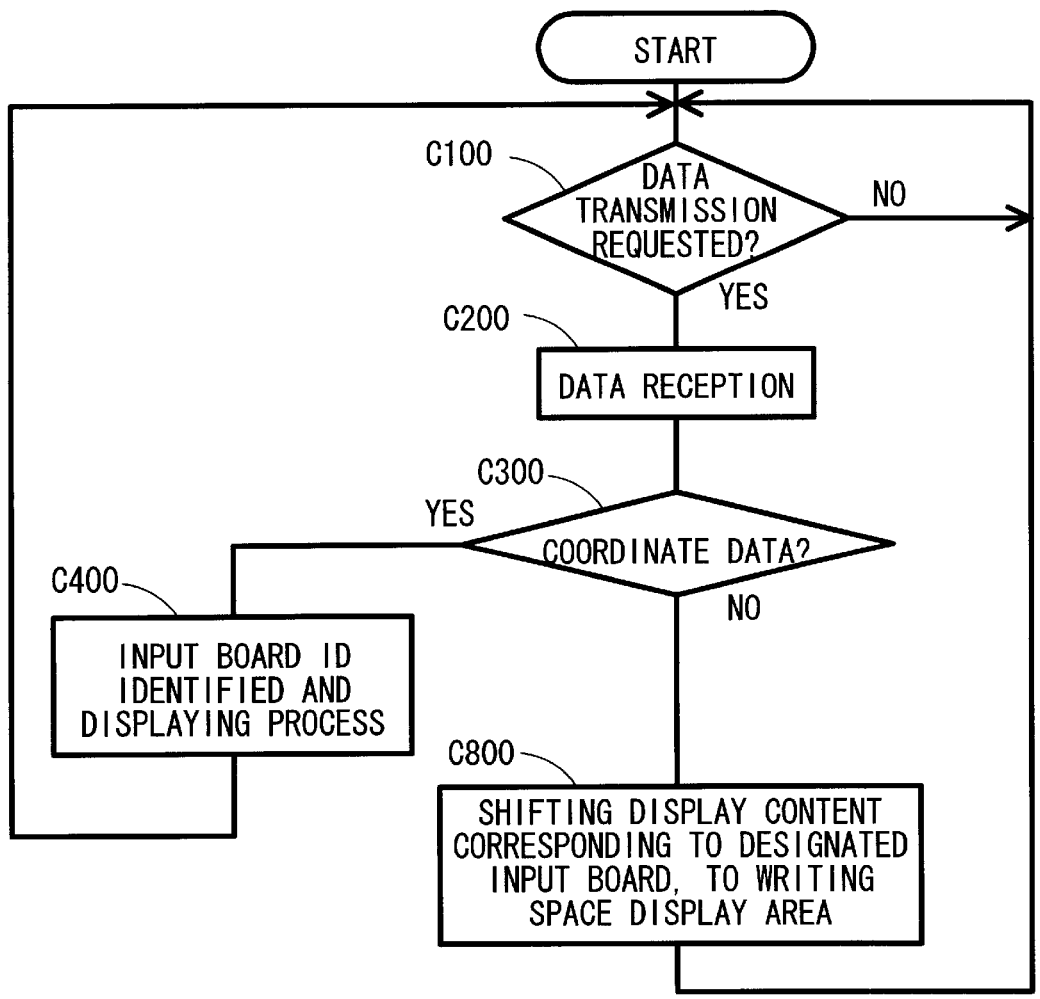
FIG. 14 is a flowchart illustrating processes performed by the display sever according to the second exemplary embodiment of the invention.

Referring to FIGS. 12 to 14, a second exemplary embodiment of the invention will be described below. Structures in the second exemplary embodiment are basically the same as the structures in the first exemplary embodiment, except for the software-based processing. In FIG. 12, an input board 11A includes a designation unit 34A, in place of the majority vote unit 34. The designation unit 34A is structured as substantially the same as the majority vote unit 34.

Instead of step B30 in FIG. 9, in which the transmitter 32 determines whether voting is conducted, the transmitter 32 determines in step B50 whether the user performs a designation operation on the control panel 18, in transmission processes shown in FIG. 13.

The designation operation is similar to the voting conducted in the first exemplary embodiment. When the user would like to designate an opinion displayed on the display panel 12a of the display server 12 to which the user thinks attention needs to be given, the user inputs on the control panel 18 a number assigned to the input board 11 on which the opinion is input. If such designation operation is conducted, the designation unit 34A creates a designation data packet including designation data (designated input board ID) to which the ID of the designating input board 11 is attached. The designation data packet is transmitted to the transmitter 32. When the transmitter 32 determines that the designation operation is conducted in step B50 (step B50: YES), the transmitter 32 transmits the designation data packet to the display server 12 (in step B60).

In FIG. 14 illustrating the flowchart of processes performed by the display server 12, steps C500, C600, and C700 in FIG. 10 are eliminated. When the display controller 38 determines in step C300, that the received data is not the coordinate data (step C300: NO), the coordinate data for the manual input in the input board 11, whose ID is designated in the designation data packet, is shifted from the individual display unit 36 to the writing space display unit 37 (in step C800). In the second exemplary embodiment, the vote counting is not performed to determine the majority vote, as in the first exemplary embodiment. The displayed content which is designated by one of the participants, is unconditionally shifted to and displayed in the writing display area 40. In this case, a chairperson or a secretariat of the conference may have a right to designate the input board 11. Alternatively, all the participants may have rights to designate the input board 11. Every time one of the participants designates the number assigned to the input board 11, a content which is displayed in the individual display area 39 and is input in the designated input board 11, may be shifted to and displayed in the writing display area 40.

In the above-described second exemplary embodiment, the designation operation is conducted by inputting on the control panel 18 a number assigned to the input board 11 whose relative individual display area 39 displays a content to which the user thinks attention needs to be given. When the designation operation is conducted, the display controller 38 shifts to and displays, in the writing display area 40, the content which is displayed in the individual display area 39 and is input in the designated input board 11. Therefore, the contents that the user would like to give attention thereto may be emphasized.

Figure 15:
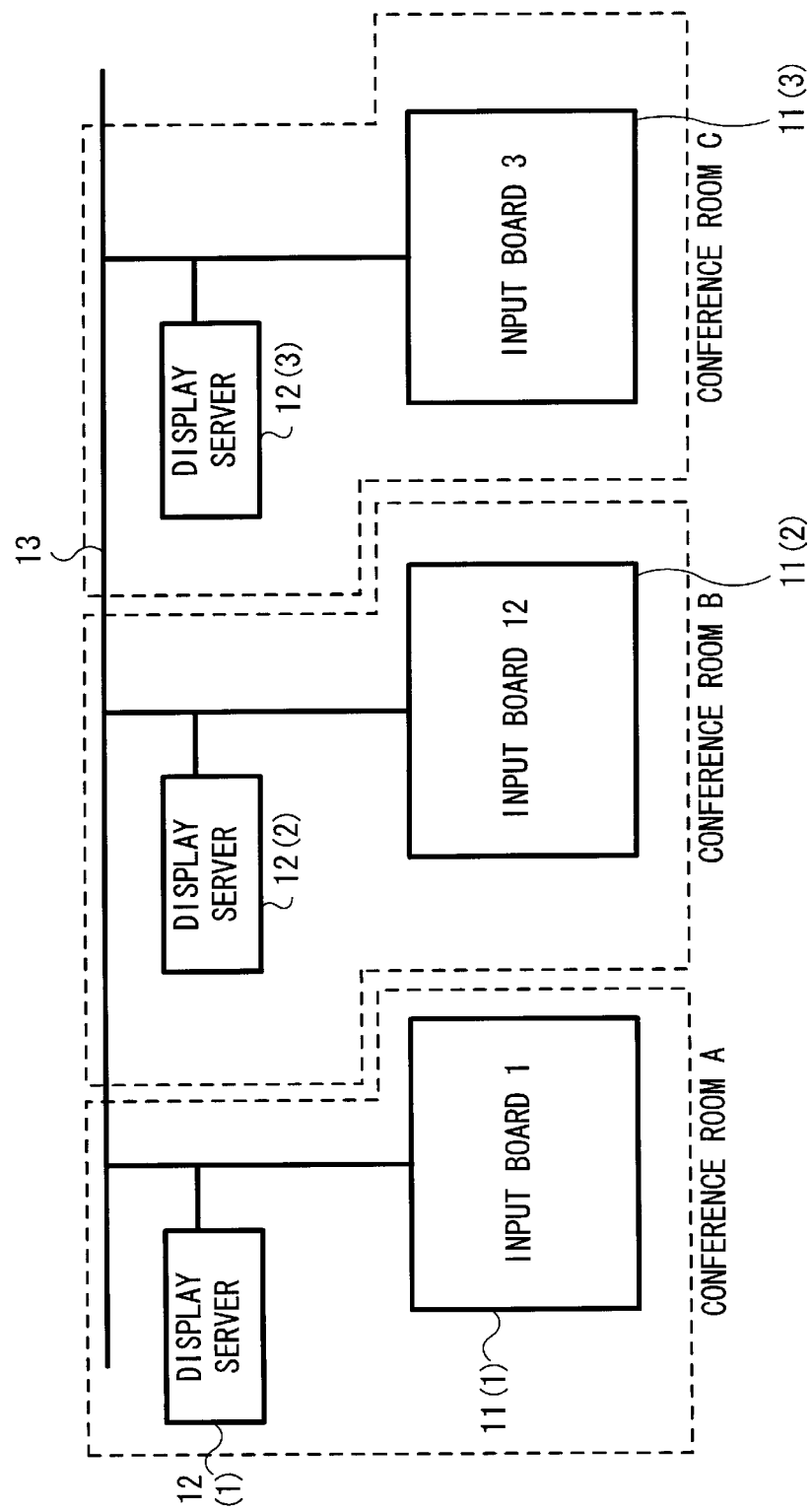
FIG. 15 is a schematic illustrating constructions of the manually input data display system according to a third exemplary embodiment of the invention.

Referring to FIGS. 15 and 16A through 16C, a third exemplary embodiment of the invention is described below. In the third exemplary embodiment, conference rooms A, B, and C are remotely located, as shown in FIG. 15. In each of the conference rooms A, B, and C, one of the input boards 11(1) to 11(3) and one of the display server 12(1) to 12(3) are disposed.

Figure 16C:
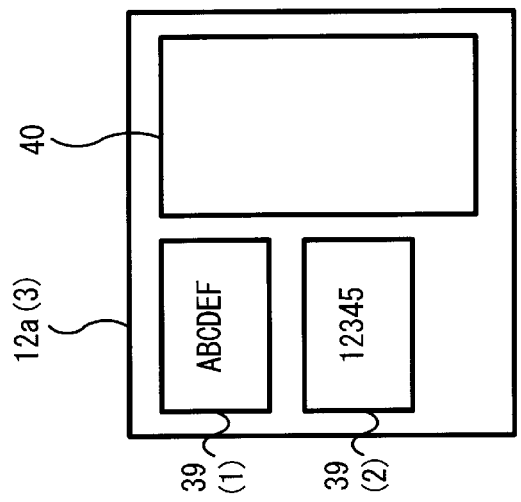
FIG. 16C is a schematic illustrating displaying examples on the display panel in a conference room C.
Figure 16B:
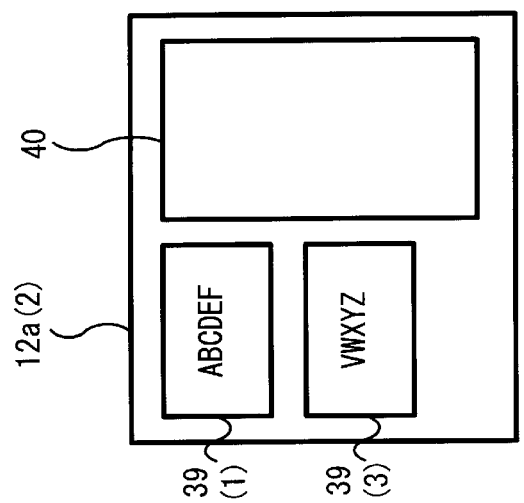
FIG. 16B is a schematic illustrating displaying examples on the display panel in a conference room B.
Figure 16A:
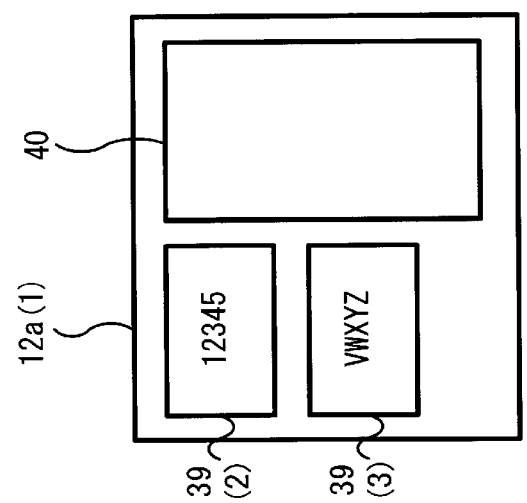
FIG. 16A is a schematic illustrating displaying examples on the display panel in a conference room A.

FIGS. 16A, 16B, and 16C show examples of displays on the display panel 12a in the conference rooms A, B, and C, respectively. As shown in FIGS. 16A, 16B, and 16C, the data transmitted from the input board 11 disposed in a conference room is not displayed in the display panel 12a in the conference room. The data transmitted from the input boards 11 in other conference rooms are displayed in the individual display areas 39 relative to the input boards 11. Such structures are enabled by each of the display servers 12(1) to 12(3) identifying the input board ID included in the data transmitted from each of the input boards 11(1) to 11(3).

As shown in FIG. 16A, for example, the display panel 12a(1) of the display server 12(1) disposed in the conference room A is provided with the individual display areas 39(2), 39(3), to display data transmitted from the input boards 11(2), 11(3) provided in the other conference rooms B and C. Such structures may be employed when the need to display data input on the input board 11 in a room, on the display panel 12a in the same room, is relatively low.

In the above-described third exemplary embodiment, the display server 12 displays, in the display panel 12a, data transmitted from the input boards 11 provided in other rooms. Therefore, the display area of the display panel 12a may be effectively used.

Figure 17:
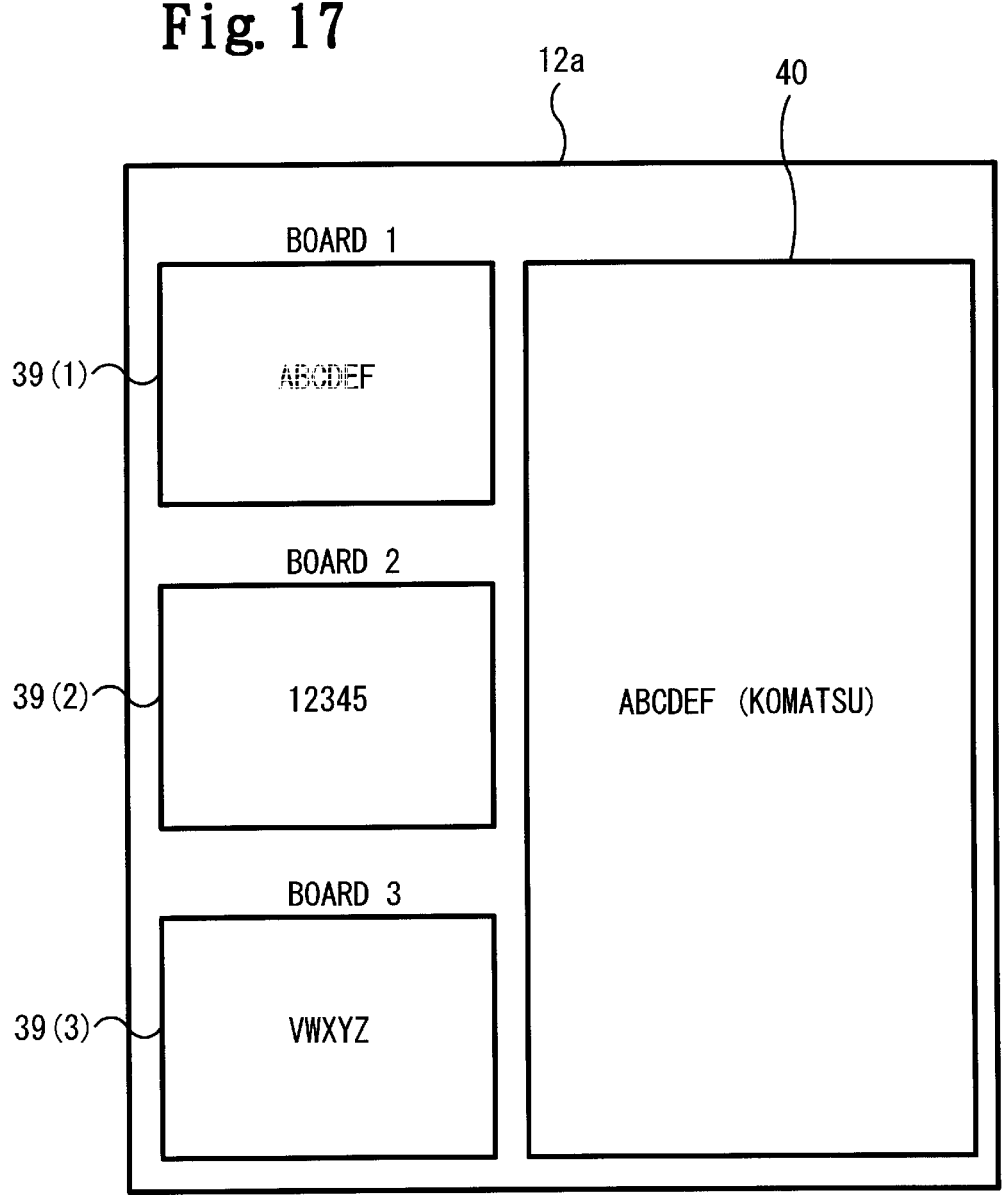
FIG. 17 is a schematic illustrating displaying examples on the display panel according to a fourth exemplary embodiment of the invention.

Referring to FIG. 17, a fourth exemplary embodiment of the invention will be described below. In the fourth exemplary embodiment, the input board 11 includes an information input unit that inputs and designates information that the user would like to display in the display panel 12a, for example, a user's name. A hardware key to input and designate such information that is displayed in the display panel 12a may be provided on the control panel 18. A software key to input and designate such information that is displayed in the display panel 12a may be provided on the writing panel 14. For example, the user's name may be input in the input board 11, using the hardware or software key. Thereafter, the stroke data input unit 31 transmits to the display server 12 the data for the user's name and the input board ID incorporated into the data packet.

The shift processing unit 38b of the display controller 38 draws the name data from the data packet. For example, when "ABCDEF", displayed in the individual display area 39(1), is shifted to the writing display area 40, a name of a user which is input in the input board 11(1), for example, "KOMATSU" is indicated following "ABCDEF", as shown in FIG. 17.

FIG. 17 illustrates the characters "ABCDEF" displayed in the individual display area 39(1) by the dotted lines to show that "ABCDEF" are shifted to the writing display area 40. However, the characters "ABCDEF" may continuously be displayed in the individual display area 39(1) even after "ABCDEF" are shifted to the writing display area 40. The characters "ABCDEF" may be deleted from the individual display area 39(1) after "ABCDEF" are shifted to the writing display area 40. The characters "ABCDEF" may be displayed in the individual display area 39(1) in a decorative manner, for example, using a font or a color different from that used for the contents displayed in the other individual display areas 39(2), 39(3).

In the above-described fourth exemplary embodiment, when the user inputs the name thereof in the input board 11, the data for the name is transmitted to the display server 12, together with the input board ID. The shift processing unit 38b draws out the data for the name and displays the name together with the content to be displayed on the writing display area 40 in the display panel 12a. With such structures, a name of a person who inputs an opinion may be displayed when the opinion is shifted to and displayed in the writing display area 40. Consequently, the participants of the conference may easily understand who inputs the opinion displayed in the writing display area 40.

Figure 18:
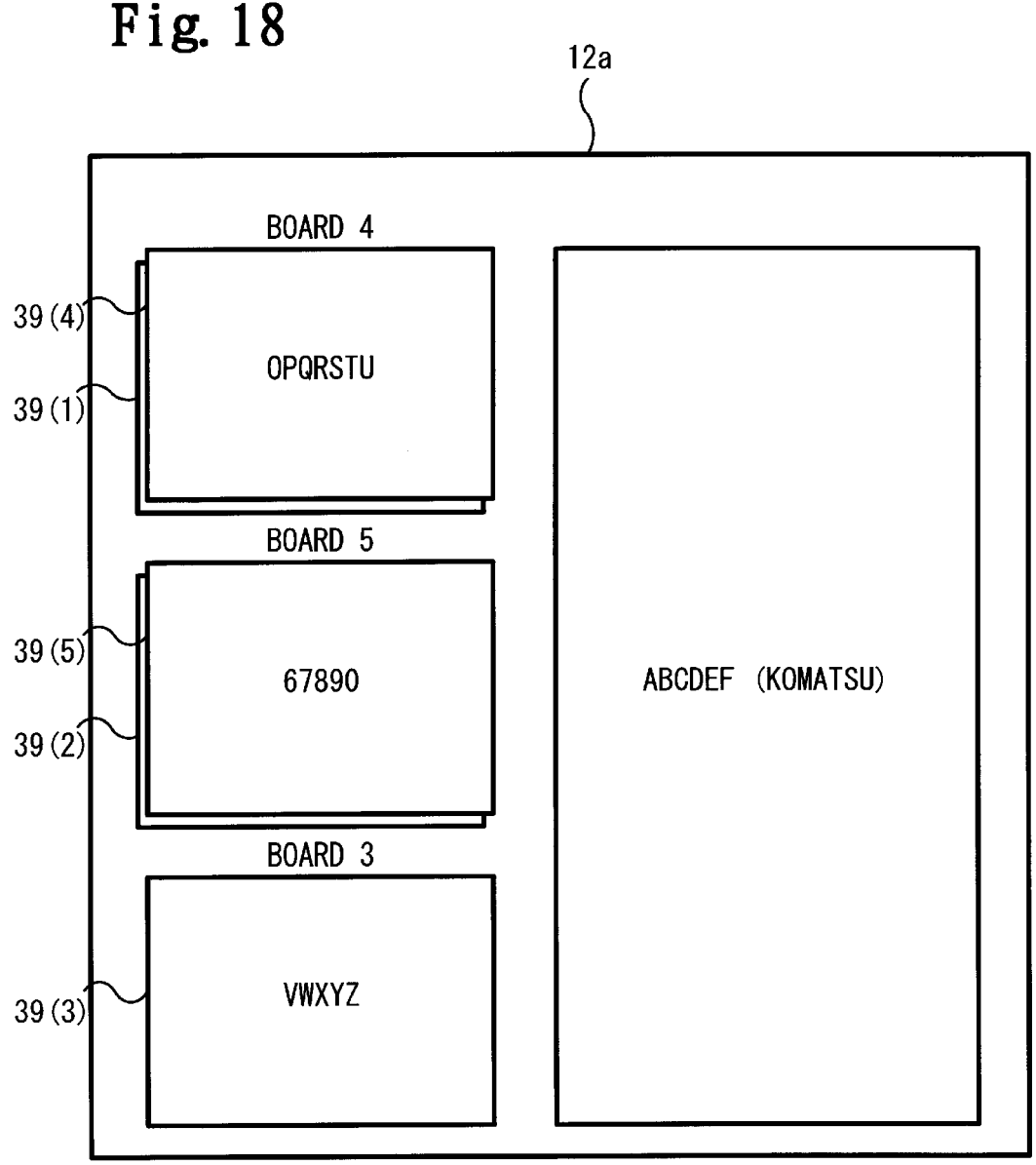
FIG. 18 is a schematic illustrating displaying examples on the display panel according to a fifth exemplary embodiment of the invention.

Referring to FIG. 18, a fifth exemplary embodiment of the invention will be described below. The fifth exemplary embodiment is similar to the first exemplary embodiment, except that, for example, five input boards 11(1) to 11(5) are provided in the fifth exemplary embodiment. It is assumed that all of the input boards 11(1) to 11(5) transmit data to the display server 12. In the first exemplary embodiment, the display area in the display panel 12a is occupied by three individual display areas 39(1) to 39(3) and one writing display area 40.

For example, as the input boards 11(4), 11(5) transmit data, when the individual display areas 39(1) to 39(3) in the display panel 12a are all occupied, the display controller 38 displays the data in the individual display areas 39(4), 39(5) in windows overlapping the individual display areas 39(1), 39(2).

In the above-described fifth exemplary embodiment, the individual display areas 39 may be stacked. Therefore, even when the large number of the input boards 11 is used, all the data transmitted from the input boards 11 may be displayed by effectively using the display area of the display panel 12a. Since the windows that displays the latest data transmitted from the input boards 11(4), 11(5) are disposed on the top of the stack, newly input characters/graphics may be viewed in windows on the top of the stack. In this case, the windows of the individual display areas 39(1), 39(2) may be moved to the top of the stack by the operation on the control panel 18.

Figure 19:
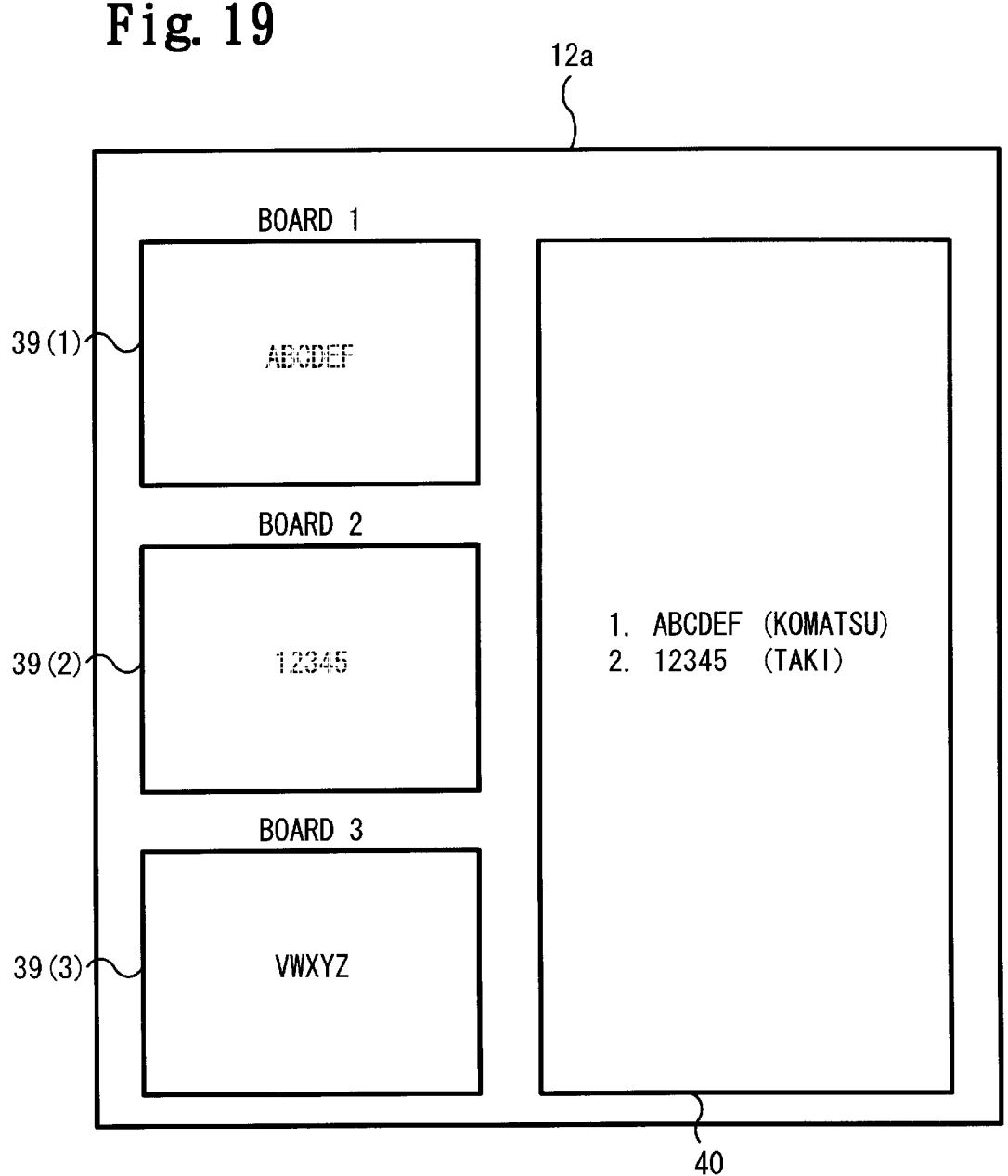
FIG. 19 is a schematic illustrating displaying examples on the display panel according to a sixth exemplary embodiment of the invention.

Referring to FIG. 19, a sixth exemplary embodiment will be described below. In the sixth exemplary embodiment, when a content displayed in the individual display area 39 are shifted to and displayed in the writing display area 40, the name of the user input in the input board 11 is indicated following the content, similar to the fourth exemplary embodiment. The shift processing unit 38b automatically attaches the serial number to the display content shifted to and displayed in the writing display area 40.

As shown in FIG. 19, when "ABCDEF", displayed in the individual display area 39(1), is first shifted to and displayed in the writing display area 40, "1." of the serial number is added at the start of "ABCDEF". When "12345", displayed in the individual display area 39(2), is next shifted to and displayed in the writing display area 40, "2." of the serial number is added at the start of "12345".

FIG. 19 illustrates the characters "ABCDEF" displayed in the individual display area 39(1) and "12345" displayed in the individual display area 39(2) by the dotted lines, to show that "ABCDEF" and "12345" are shifted to the writing display area 40. However, the characters "ABCDEF" and "12345" may continuously be displayed in the individual display areas 39(1), 39(2), respectively even after "ABCDEF" and "12345" are shifted to the writing display area 40. The characters "ABCDEF" and "12345" may be deleted from the individual display areas 39(1), 39(2), respectively after "ABCDEF" and "12345" are shifted to the writing display area 40. The characters "ABCDEF" and "12345" may be displayed in the individual display area 39(1), 39(2), respectively in a decorative manner, for example, using a font or a color different from that used for the contents displayed in the other individual display area 39(3).

In the above-described sixth exemplary embodiment, when the content displayed in the individual display area 39 is shifted to and displayed in the writing display area 40, the shift processing unit 38b automatically attaches the serial numbers to the content displayed in the writing display area 40. With the structure, it becomes easier for users to understand the contents displayed in the writing display area 40, with the serial numbers attached. The users can designate the content displayed in the writing display area 40, by the serial numbers attached thereto.

Figure 20:
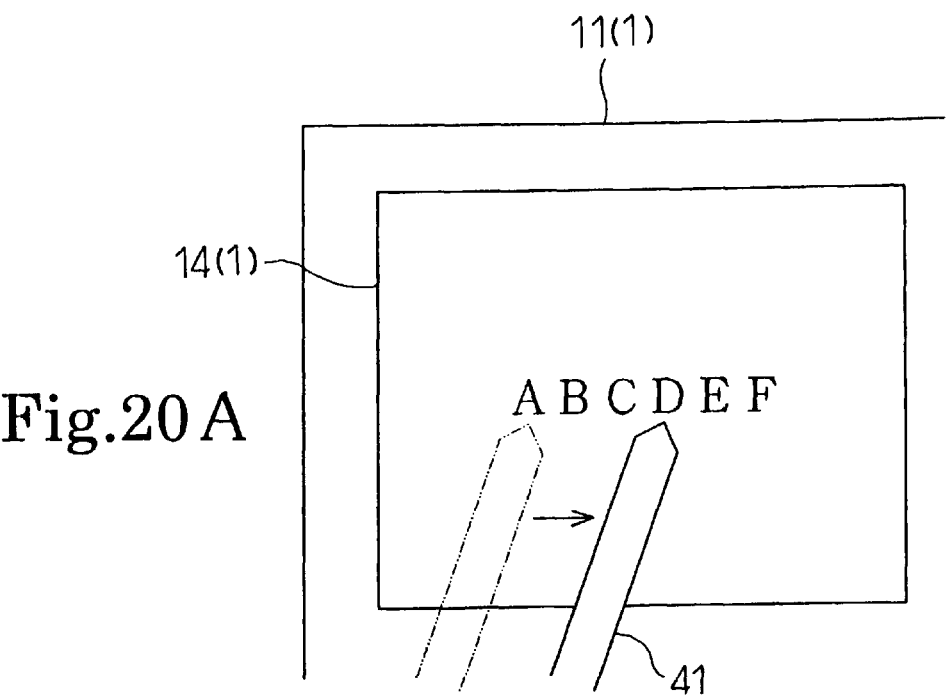
FIG. 20A is a schematic illustrating a path of a pointer moving on a writing panel according to the seventh exemplary embodiment of the invention.
FIG. 20B is a schematic illustrating the path of the pointer appeared on the display panel according to the movement shown in FIG. 20A.
Figure 20:
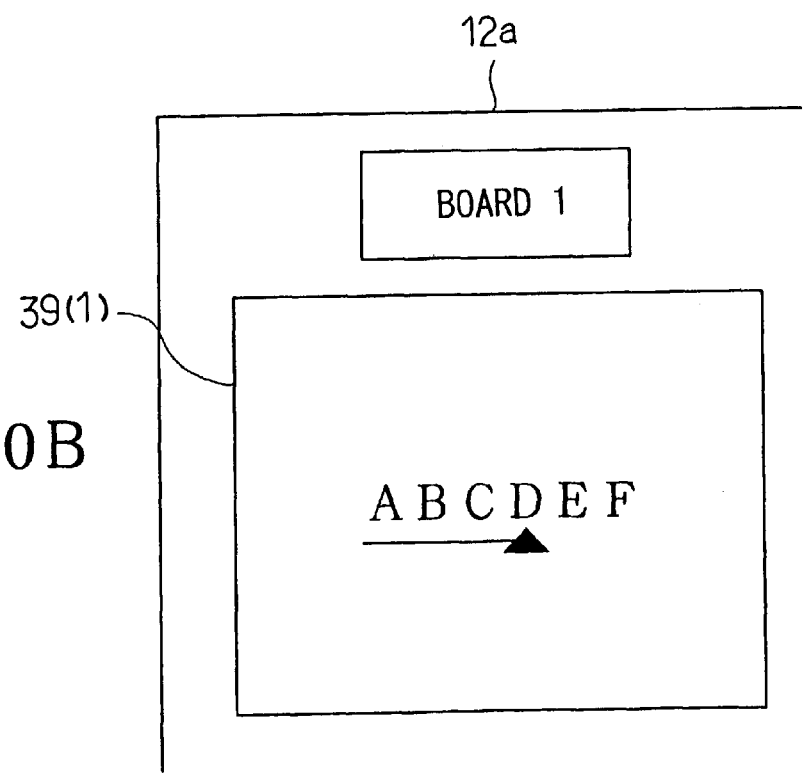

Referring to FIGS. 20A and 20B, a seventh exemplary embodiment of the invention will be described. In the seventh exemplary embodiment, employed is a pointer 41 that points to characters/graphics manually input on the writing panel 14 in the input board 11. The pointer 41 has such structures that the pen tip 27 and the ink cartridge 26 are removed from the pen 15. The pointer 41 includes a battery and a coil for generating a magnetic field. The pointer 41 outputs to the stroke data input unit 31 a FSK modulated signal based on the ID predetermined for the pointer 41. The stroke data input unit 31 performs the following processes, as the stroke data input unit 31 determines that the pointer 41 is used by demodulating the FSK modulated signal.

Using the pointer 41, the user of the input board 11(1) points to "ABCDEF" input using the pen 15, as shown in FIG. 20a. Characters written in ink using the pen 15 are indicated on the writing sheet 19 of the writing panel 14(1). The user first points to the lower side of the character "A", with a tip of the pointer 41. Then, the user moves the pointer 41 to the right side in FIG. 20A. Currently, the lower side of the character "D" is pointed with the pointer 41.

Figure 8B:
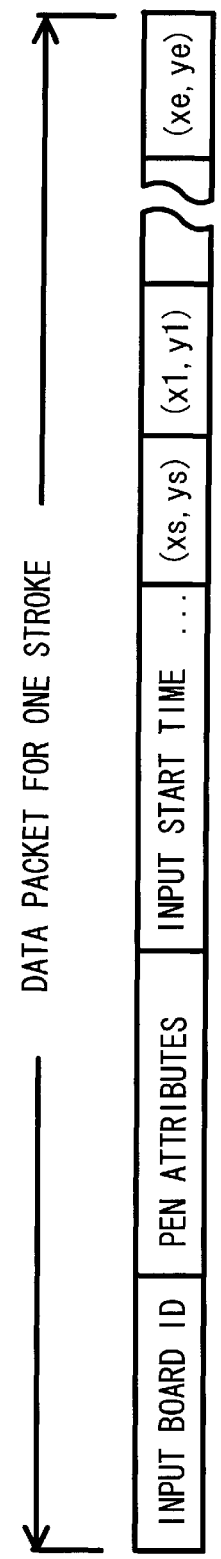
FIG. 8B is a schematic illustrating a format of a data packet based on the coordinate data for one stroke shown in FIG. 8A.

When the stroke data unit 31 identifies the ID of the pointer 41, the ID is set in the "pen attributes" field shown in FIG. 8B in the first exemplary embodiment. Data packet including coordinate data for pointer's pointing position is transmitted to the display server 12. When the display controller 38 of the display server 12 receives the data packet and determines that the received data is the coordinate data for the pointing position of the pointer 41, the display controller 38 displays a black triangle cursor on the display panel 12a at the position corresponding to the coordinates of the pointing position of the pointer 41, as shown in FIG. 20B. At this time, the path of the pointer 41, moved from "A" to "D", is indicated by a line whose color and thickness are different from the color and thickness of the characters.

The black triangle cursor and a line indicating the path of the pointer 41 may disappear when the tip of the pointer 41 moves off the writing sheet 19 and the transmission from the input board 11 of the data packet, including the coordinate data for the pointing position of the pointer 41, is finished. The black triangle cursor and the line indicating the path of the pointer 41 may remain until the eraser 16 is used, even though the transmission of the data packet is finished.

In the above-described seventh exemplary embodiment, the pointing position of the pointer 41 and the path of the pointer 41 may be displayed in the display panel 12a of the display server 12 when the pointer 41 is used in the input board 11. Therefore, the manually input data, such as characters and graphics, may be pointed with the pointer 41 during a conference. This enables the participants of the conference to convey intentions thereof clearly.

While the invention has been described with reference to the exemplary embodiments, it is to be understood that the invention is not restricted to the particular forms shown in the foregoing exemplary embodiments. Various modifications and alterations can be made thereto without departing from the scope of the invention.

For example, the input board 11 and the display server 12 may be connected in various manners other than a manner described in the above exemplary embodiments. For example, a plurality of display servers 12 may be provided in one conference room. A public telephone line may be used for the communication line 13 when the communications are conducted between remotely located conference rooms. When the communications are conducted in one conference room or in a plurality of the conference rooms within one building, the LAN or a communications protocol may be used.

The individual display areas 39 may be provided according to the number of input boards 11 that actually transmit the data, or may be provided for all of the input boards 11 that are connected and are enabled for communications.

In the first exemplary embodiment, as the data manually input on the writing panel 19 is entirely erased by the eraser 16, the coordinate data for the data is transmitted to the display server 12. However, a hardware key or a software key for the data transmission may be provided on the control panel 18 or the wiring panel 14, to transmit the data when the key is pressed. Further, the data may be sequentially transmitted every time one stroke is input.

In the fourth exemplary embodiment, when the display content is shifted to and displayed in the writing display area 40, information that the user would like to add to a display content, is designated in the input board 11. Similarly, a heading or a title may be added to a display content when the content is shifted to and displayed in the writing display area 40, by providing a heading designation unit that inputs and designates a heading to be added to a display content shifted to and displayed in the writing display area 40. For example, when a heading such as "idea", "proposal", "problem", and "solution", is input and designated, such a heading may be displayed together with the display content shifted to and displayed in the writing display area 40. The structures enable the participants to easily understand what the contents shifted to the writing display area 40 are about.

In the seventh exemplary embodiment, the indication of the path of the pointer 41 may flash on and off. The path of the pointer 41 may be indicated by after-image or persistence of vision. A position pointed with the pointer 41 may just be indicated without indicating the path of the pointer 41.

If necessary, the display contents may be indicated on the display server 12 in colors (e.g., black, blue, red, etc.) predetermined based on the ID of the pen 15.

An eighth exemplary embodiment of the invention will be described with reference to FIGS. 21 to 30B. It is to be noted that the similar reference numerals donate the similar components described in the above exemplary embodiments and the detail description thereof is omitted. As shown in FIG. 22, each of input display boards 10(1), 10(2), 10(3) includes an input board unit 110 that electrically reads characters/graphics manually written on the writing sheet 19 as coordinate data, and a display unit 120 that displays the characters/graphics based on the coordinate data read by the input board unit 110.

Figure 23:
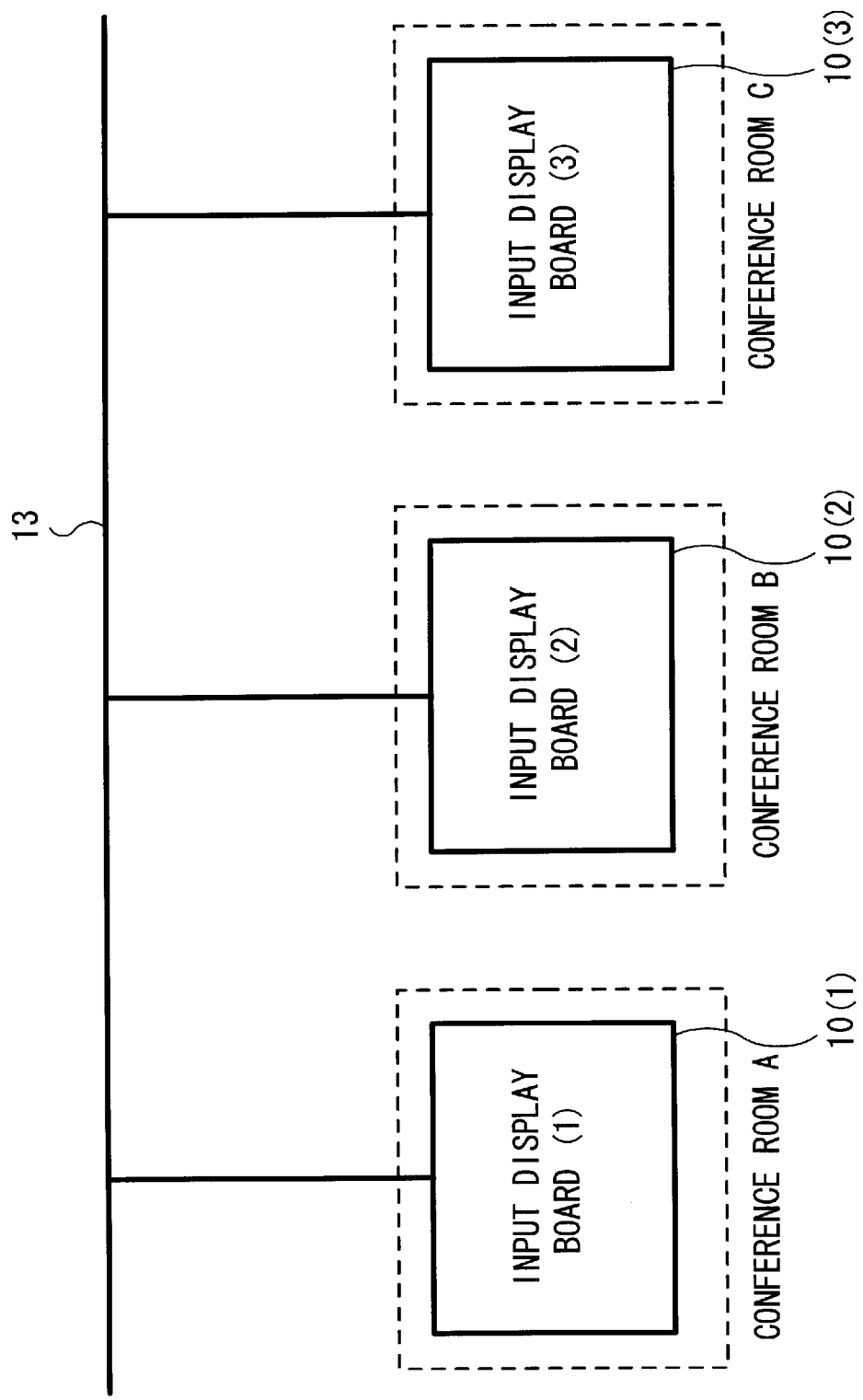
FIG. 23 is a schematic illustrating constructions of the manually input data display system according to the eighth exemplary embodiment through an eleventh exemplary embodiment of the invention.

In FIG. 23 illustrating constructions of the manually input data display system, the input display boards 10(1) to 10(3) may be connected to each other, through the communication line 13 (such as a telephone line). For example, each of the input display boards 10(1) to 10(3) may be disposed on a table in each of remotely located conference rooms A, B, and C, so that each of participants in the conference rooms A, B, and C keeps the input display boards 10(1) to 10(3) on hand.

Structures of the input board unit 110 shown in FIG. 22 are basically the same as the structures of one of the input boards 11(1) to 11(3) according to the first exemplary embodiment of the invention. In FIG. 22, a user may write characters/graphics on a writing surface of the writing panel 14, using the pen 15 on the input board unit 110. The characters/graphics written on the writing surface of the writing panel 14 may be erased using the eraser 16. The writing panel 14 is built into the case-like frame 17. On a side of the frame 17, the control panel 18 is provided. Structures of the pen 15, shown in FIG. 22 according to the eighth exemplary embodiment, are basically the same as structures of the pen 15, shown in FIG. 4, according to the first exemplary embodiment of the invention.

The display unit 120 includes a display panel 120a of, for example, a liquid crystal display. As shown in FIG. 22, the input board unit 110 and the display unit 120 are integrally formed. The input board unit 110 is horizontally placed to face the writing sheet 19 upwardly, so that a user may manually input characters and graphics on the writing sheet 19. The display unit 120 is pivotally connected to the input board unit 110 through a hinge, to open or close the display unit 120. The display unit 120 is usually opened when the display unit 120 is used.

Figure 21:
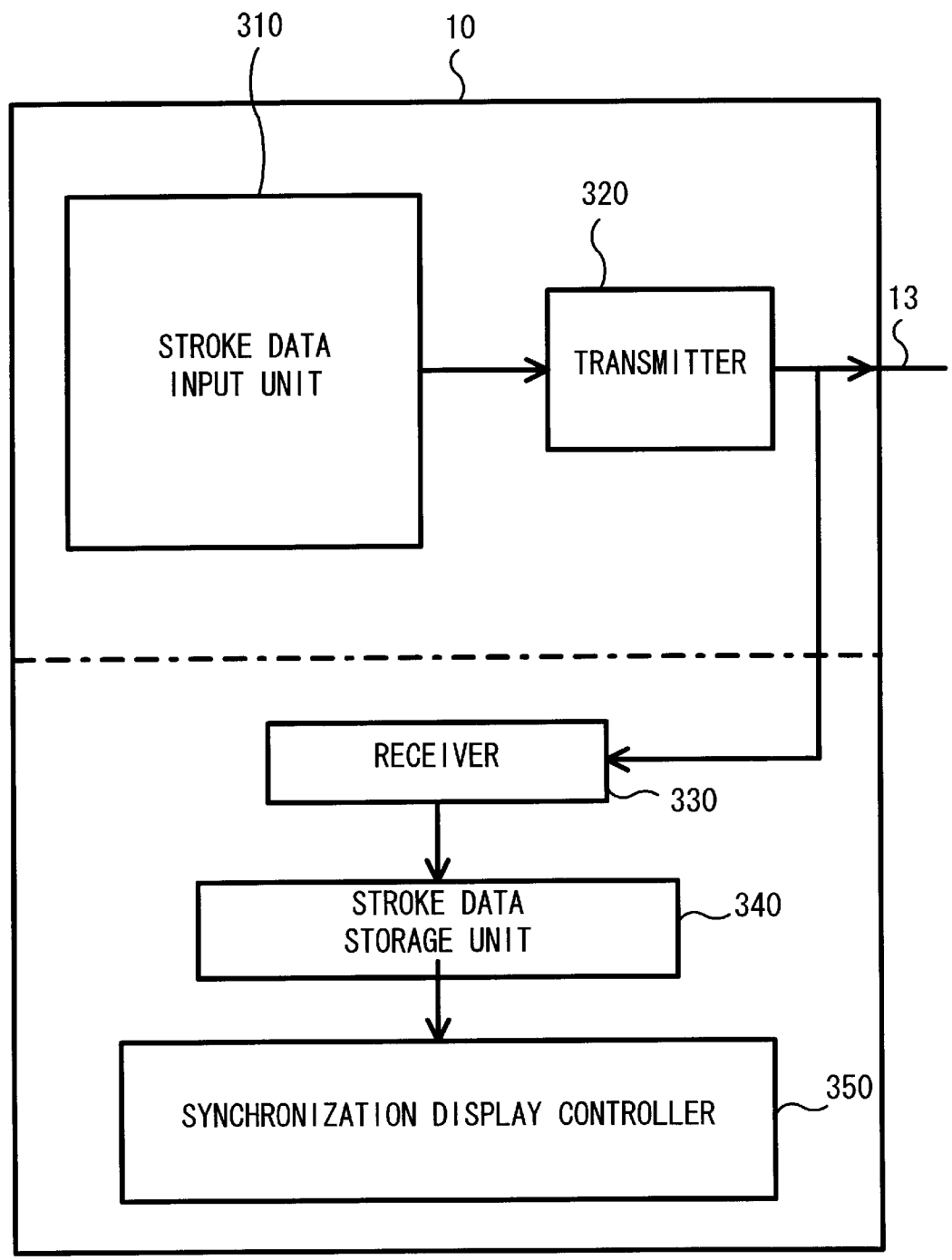
FIG. 21 is a block diagram illustrating an electrical configuration of an input display board according to an eighth exemplary embodiment of the invention.
Figure 22:
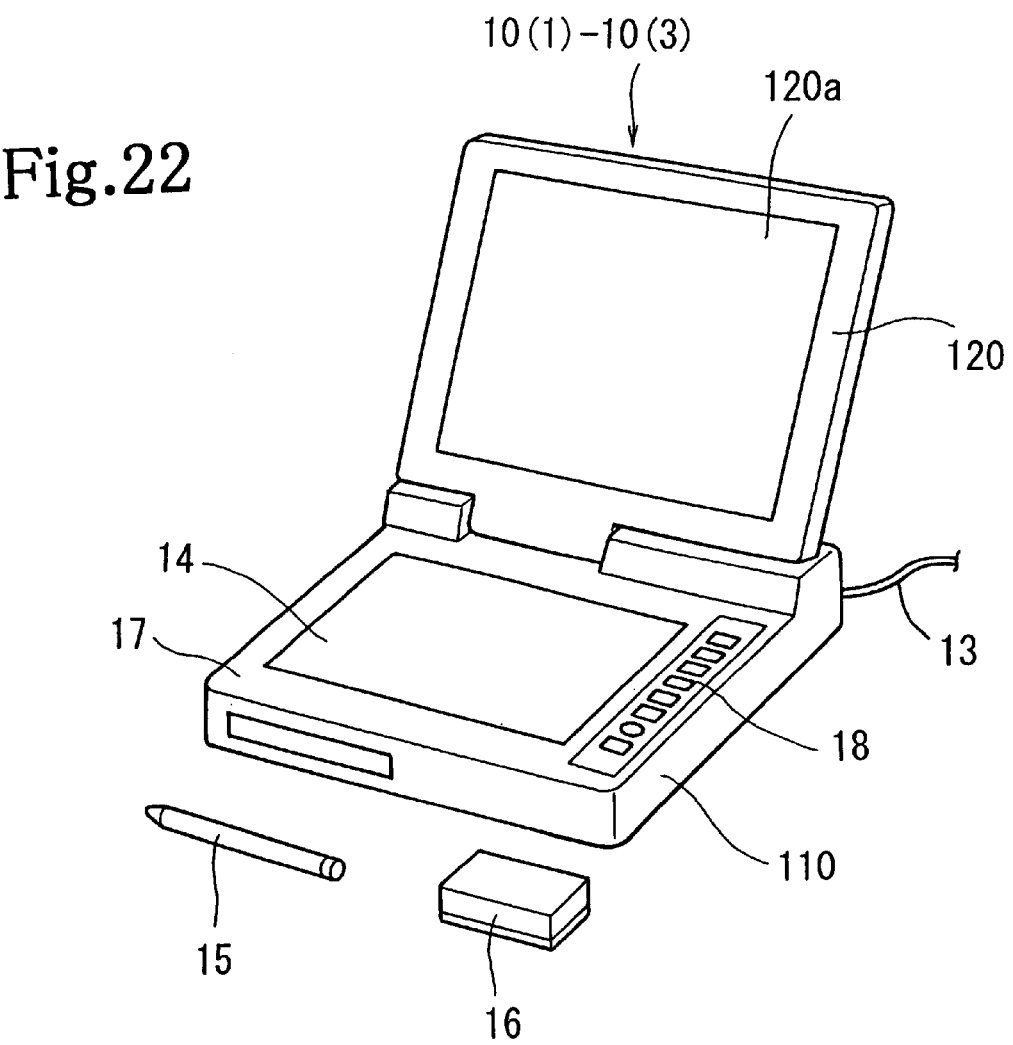
FIG. 22 is a perspective view of the input display board.

FIG. 21 shows an electrical configuration of the input display board 10. A stroke data input unit 310 includes a memory such as a central processing unit (CPU), a read-only memory (ROM), and a random-access memory (RAM), a multiplexor that selects signals output from the coil 21, an amplifier that amplifies signals, an A/D converter, a FSK demodulation circuit, and a real time clock (RTC) IC that obtains time data.

A transmitter 320 is a communication interface for transmitting the coordinate data obtained in stroke data input unit 310, to a receiver 330 of the same input display board 10, and to the other input display boards 10 through the communication line 13. The receiver 330 is a communication interface for receiving the data transmitted from the transmitter 320 of the same input display board 10, and the data transmitted from the other input display boards 10. The data received by the receiver 330 is written into and stored in the stroke data storage unit 340.

A synchronization display controller 350 displays in real time, on the display unit 120, the characters/graphics based on the coordinate data received by the receiver 330 and stored in the stroke data storage unit 340. The synchronization display controller 350 performs playback processes in which characters/graphics, based on the coordinate data, stored in the stroke data storage unit 340 are displayed again, as a display request is made by a user once the manual input is finished. Sounds or voices generated during the conference may be conveyed between the conference rooms, using a separate transmission/receiver system (in which the communication line 13 may be shared).

Figure 24:
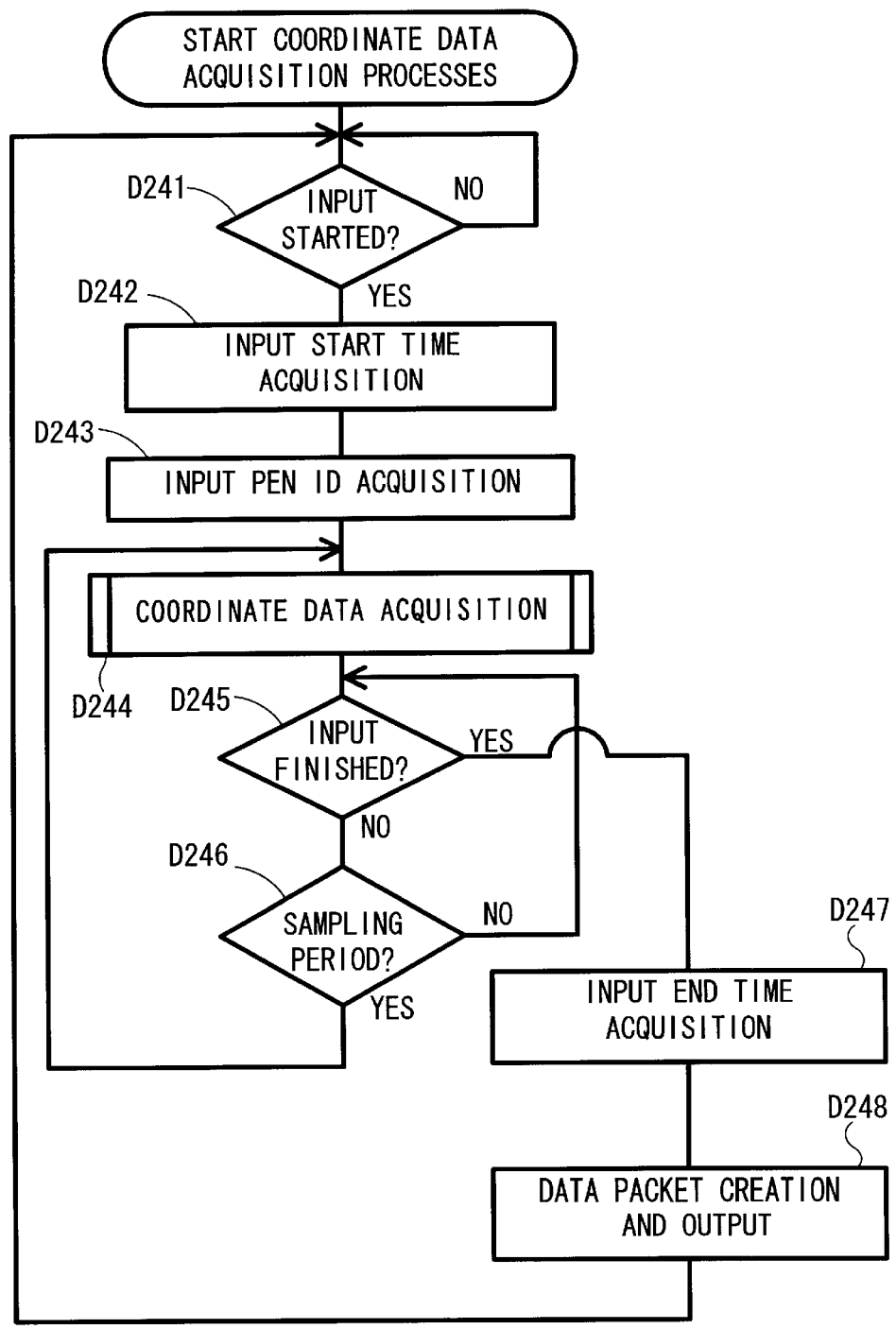
FIG. 24 is a flowchart of processes performed by the stroke data input unit according to the eighth exemplary embodiment of the invention.

Processing performed by the input display board 10 according to the eighth exemplary embodiment will be described below, with reference to FIGS. 24 to 29. FIG. 24 is a flowchart of coordinate data acquisition processes performed by the stroke data input unit 310 when the user draws characters/graphics using the pen 15 on the writing sheet 19 in the input board unit 110. As described above, when the user pushes the pen tip 27 of the pen 15 onto the writing sheet 19, the switch 30 provided inside of the pen 15 is turned on, so that the alternating magnetic field (FSK modulated signal) is generated from the coil 25.

When the stroke data input unit 310 determines, by the detection of the alternating magnetic field, that a manual input is started (step D241: YES), the input start time data (time stamp) is obtained by the RTC IC (in step D242). Thereafter, the identification (ID) of the pen 15 is obtained, based on the demodulation level of the FSK modulated signal transmitted from the pen 15 (in step D243). The coordinate data for a start point of the input is then obtained (in step D244).

Figure 25A:
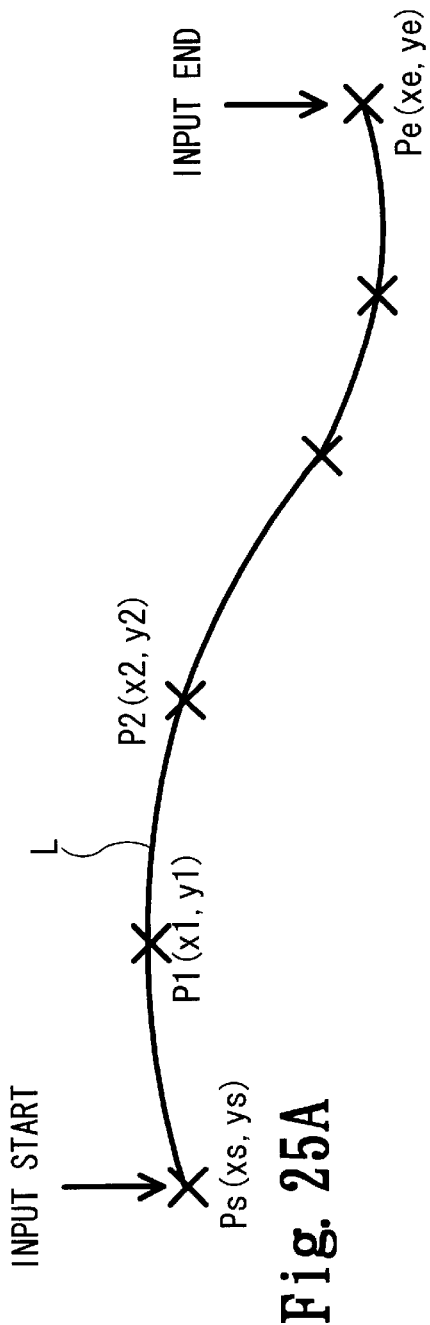
FIG. 25A is a schematic illustrating an example of coordinate data for one stroke obtained when a user draws a line L in an input board unit.
Figure 25B:
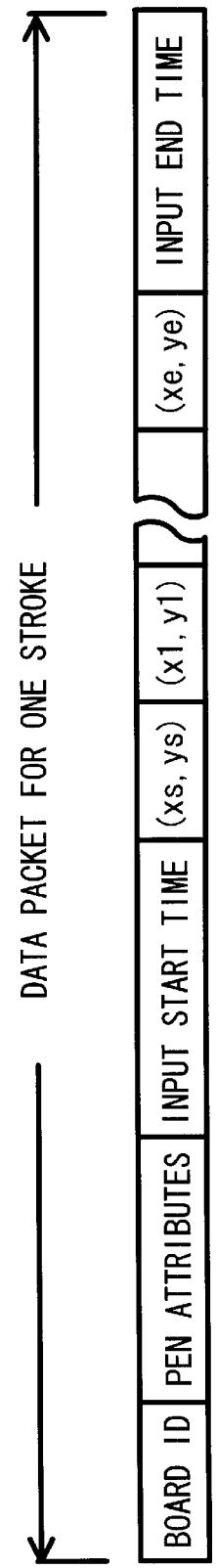
FIG. 25B is a schematic illustrating a format of a data packet based on the coordinate data for one stroke shown in FIG. 25A.

The coordinate data acquisition will be briefly explained below. FIG. 25A is a schematic illustrating an example of coordinate data obtained for such a series of actions (one stroke) when the user puts the pen 15 on a point Ps on the writing sheet 19 on the input board unit 110 and moves the pen 15 off at a point Pe, drawing a line L.

As the alternating magnetic field generated from the coil 25 of the pen 15 is magnetically coupled to the coil 21 in the input board unit 110, a voltage signal is induced to the coil 21. The stroke data input unit 310 of the input board unit 110 sequentially reads levels of the voltage signals induced on the X-coils of the coil 21 (X1, X2, . . . , Xm), by A/D converting the signals. The voltage signal levels are stored in the memory. The X coordinate is determined by the point on the X-coil which shows the highest voltage signal level. Similarly, the stroke data input unit 310 sequentially reads levels of the voltage signals induced on the Y-coils of the coil 21 (Y1, Y2, . . . , Yn), by A/D converting the signals. The Y coordinate is determined by the point on the Y-coil which shows the highest voltage signal level. Thus, a set of the X and Y coordinate data is obtained.

When the coordinate data (xs, ys) for the input start point Ps is obtained as described above, the stroke data input unit 310 determines whether the manual input is finished (in step D245). More specifically, when the user moves the pen tip 27 of the pen 15 off the writing sheet 19, the switch 30 inside the pen 15 is turned off, stopping the output of the alternating magnetic field. By the detection of the alternating magnetic field, it is determined whether the manual input is finished. When it is determined that the manual input has not yet finished (step D245: NO), the stroke data input unit 310 waits until next sampling period comes. When the next sampling period comes (step D246: YES), the flow returns to step D244 to obtain the next coordinate data (x1, y1).

As shown in FIG. 25A, as the coordinate data for the points Ps, P1, P2, and so on, is sequentially obtained and it is determined that manual input is finished at the point Pe (step D245: YES), the point Pe is set to the input end point. The input end time is obtained by the RTC IC (in step D247). A line starting from the input start point Ps and ending at the input end point Pe corresponds to one stroke. For example, when a letter "A" written and manually input, the letter "A" generally ends with three strokes.

The stroke data input unit 310 generates a data packet including the ID of the input display board 10 (input display board ID), the attributes (ID) of the pen 15, and the input start time data attached to the start of the coordinate data for one stroke, and the input end time data attached to the end of the coordinate data for one stroke. The data packet is output to the transmitter 320 (in step D248). Thereafter, the flow returns to step D241 and the stroke data input unit 310 waits for the input of next stroke.

The transmitter 320 receives the data packet output from the stroke data input unit 310 and outputs a data transmission request to the receiver 330 and in the same input display board 10 and the receivers 330 of the other input display boards 10. After checking that other input display boards 10 are not conducting communications, the transmitter 320 transmits the data packet for one stroke.

Figure 26:
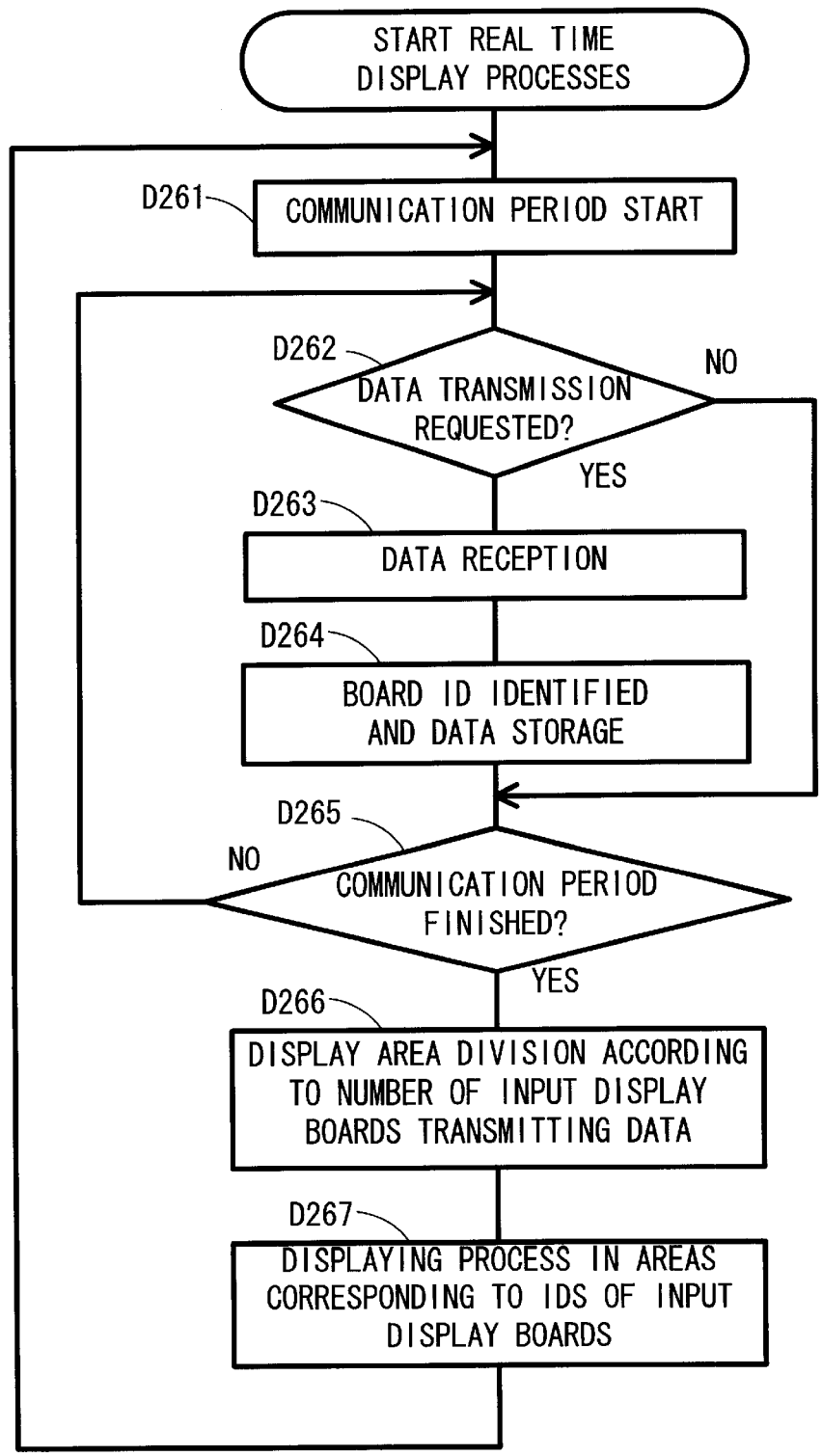
FIG. 26 is a flowchart illustrating processes performed by a display unit.

FIG. 26 shows a flowchart illustrating real time display processes performed by the display unit 120. The receiver 330 performs data reception processes during steps E261 to E265, which is set as a communication period. When the communication period starts (in step E261), the display unit 120 determines whether the data transmission is requested by the transmitter 320 of any of the input display boards 10(1) to 10(3) (in step E262). When it is determined that the data transmission is requested (step E262: YES), the display unit 120 receives the data (in step E263). The ID of the input display board 10 included in the received data is identified. The received data is stored in a storage area of the stroke data storage unit 340, predetermined according to the IDs of the input display boards 10 (in step E264). Thereafter, flow proceeds to step E265 wherein it is determined whether the communication period is finished. When it is determined that the communication period is not finished (E265: NO), flow returns to step E262 wherein the display unit 120 waits for a request of the next data transmission.

Figure 27:
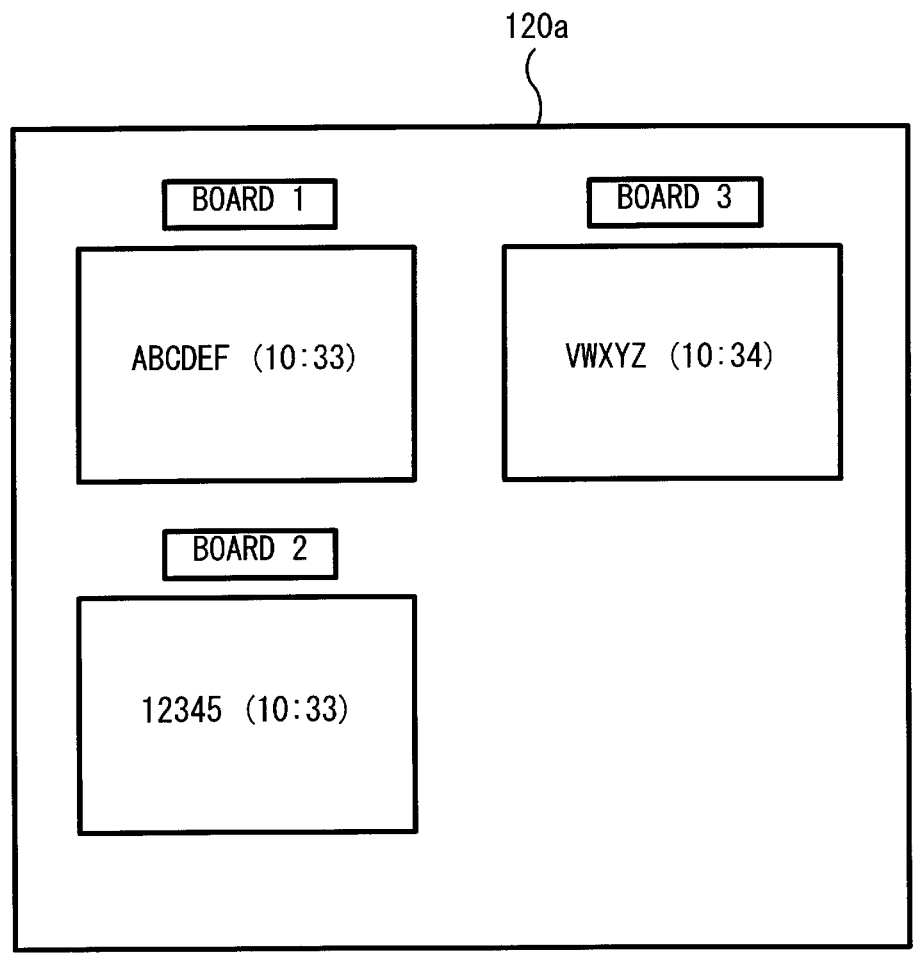
FIG. 27 is a schematic illustrating displaying examples on a display panel of the display unit.

When it is determined that the communication period is not finished (E265: YES), the synchronization display controller 350 determines the number of IDs of the input display boards 10 for the data stored in the stroke data storage unit 340. The display area of the display panel 120a is divided, according to the number of the input display board IDs. For example, as the number of the input display board IDs is determined as three, the display area of the display panel 120a is divided into three (in step E266), to correspond to the IDs of the input display boards 10, as shown in FIG. 27. The characters/graphics are displayed based on the coordinate data in the corresponding display areas (in step E267). More specifically, based on the coordinate data for strokes, the characters/graphics are displayed by providing a line between two points, for example, points Ps and P1, and points P1 and P2, in FIG. 25A.

For example, when characters "ABCDEF", "12345", and "VWXYZ" are manually input in the input display boards 10(1), 10(2), and 10(3), respectively, each of characters "ABCDEF", "12345", and "VWXYZ" are displayed in the corresponding display areas in the display unit 120. In this case, each of the display areas in the display panel 120a indicates the IDs of the input display boards 10, such as "BOARD 1", "BOARD 2", and "BOARD 3", so that people who see the display panel 120a can easily understand in which input board units 110 the displayed contents are input.

The display contents are indicated on the display unit 120 in colors (e.g., black, blue, red, etc.) predetermined based on the ID of the pen 15. The input start time is displayed at the end of the display content. FIG. 27 shows that characters "ABCDEF" and "12345" are both started to be input at 10:33, and "VWXYZ" is started to be input at 10:34.

With the above-described real time display processes, characters/graphics input in each of the input display boards 10(1) to 10(3) are sequentially displayed in real time on the corresponding display areas in the display panel 120a.

Figure 28:
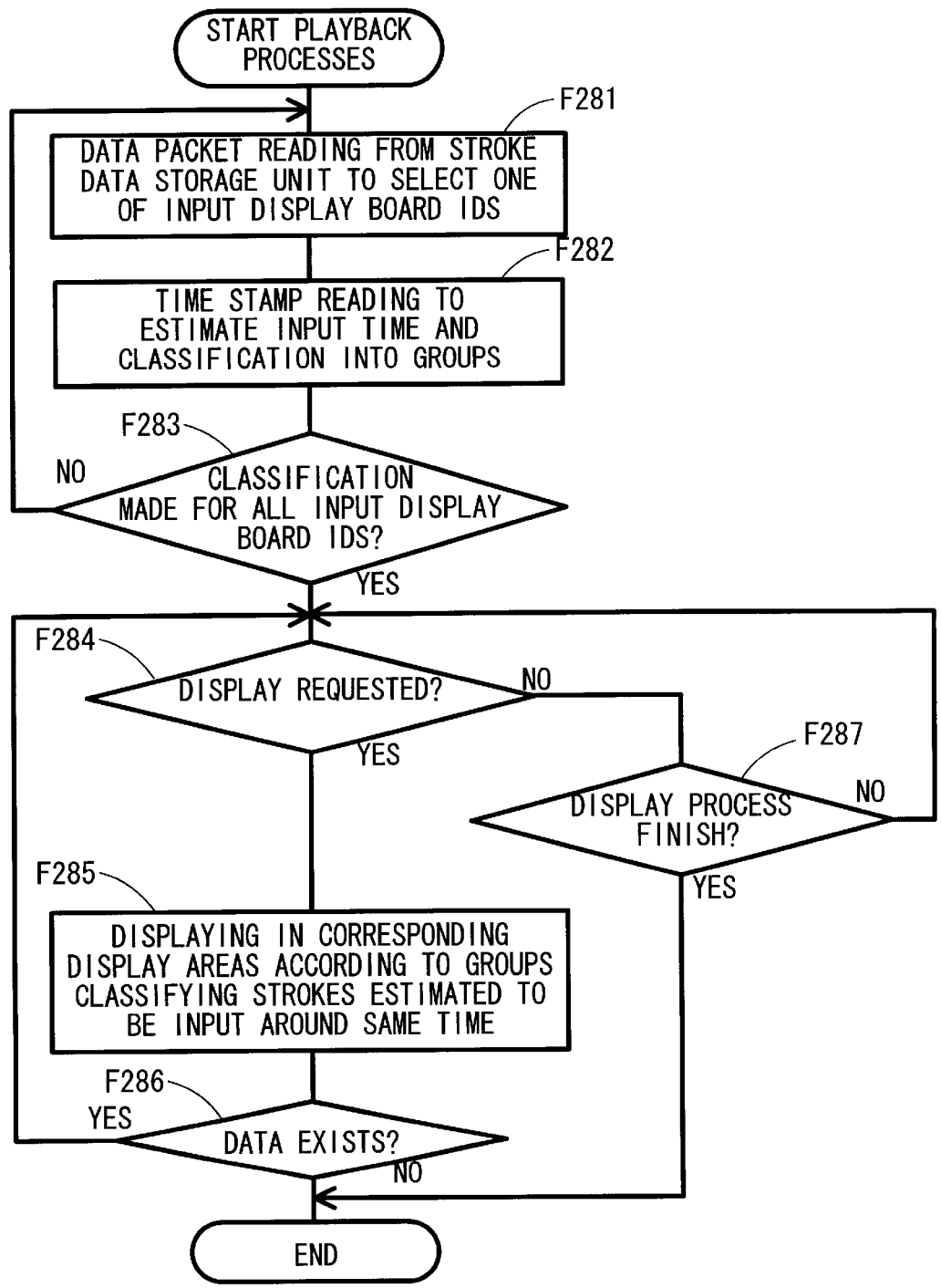
FIG. 28 is a flowchart illustrating playback processes performed by the display unit.

FIG. 28 is a flowchart illustrating playback processes performed by the display unit 120. The playback processes start when the user selects a playback mode. The synchronization display controller 350 reads the data packets from the stroke data storage unit 340, to select one of the IDs of the input display boards 10(1) to 10(3) included in the data packet (in step F281). At this time, the first ID to be selected is determined based on the data packet, including the earliest input start time. The earliest input start time is used as a reference.

Figure 29:
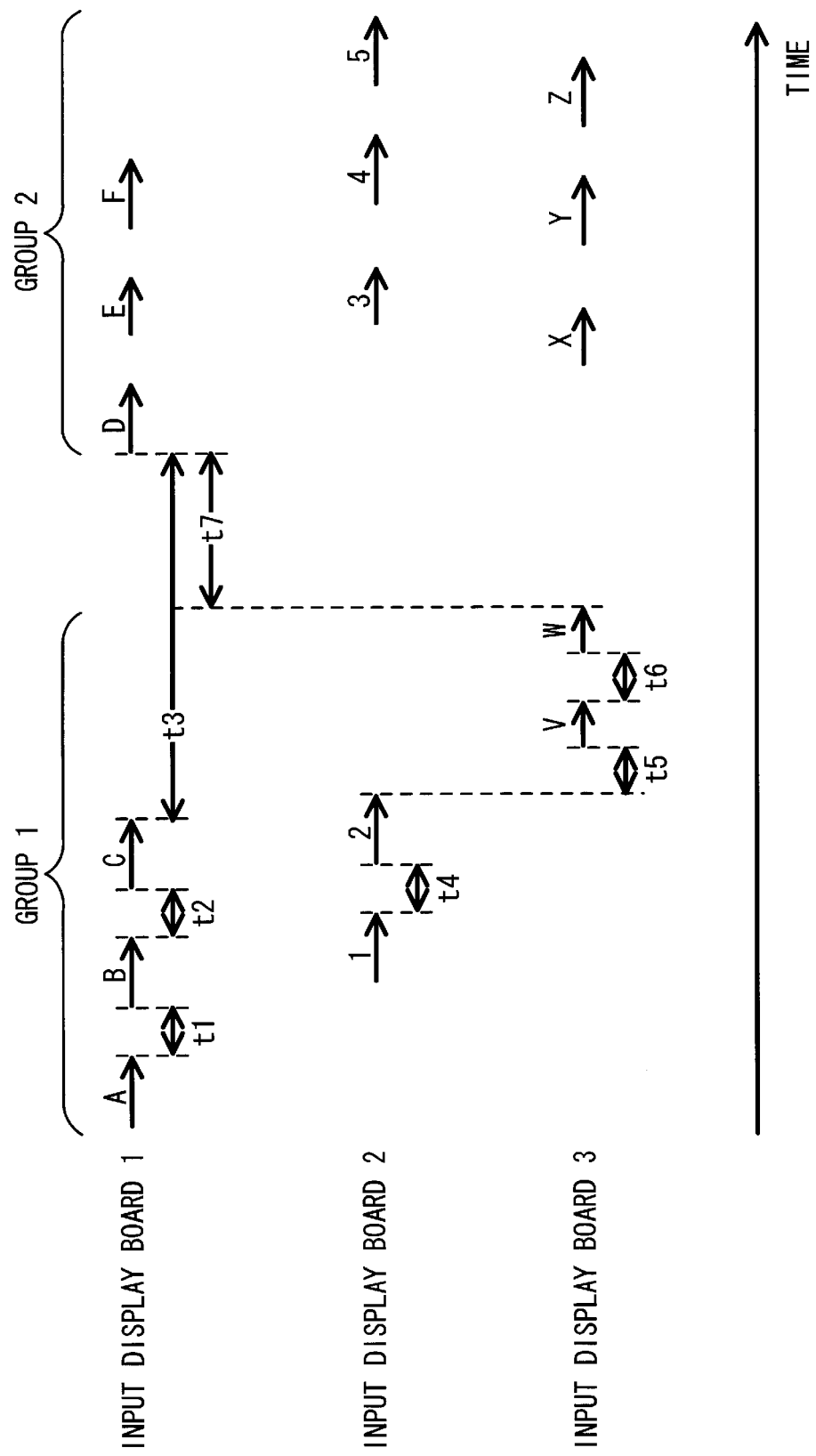
FIG. 29 is a time chart illustrating inputs of strokes.

The synchronization display controller 350 estimates input time of strokes input in one of the input display boards 10(1) to 10(3) whose ID is selected, by reading the time stamp in each data packet for the strokes, and classifies the strokes into appropriate groups (in step F282). FIG. 29 is a time chart when strokes are input. The input start and end times of the strokes for characters "A" to "F", input in the input display board 10(1), are first compared, since the ID of the input display board 10(1) is firstly selected based on the data packet including the earliest input start time. In FIG. 29, the strokes for one character are shown in a single line, for the simplicity of explanation.

The difference between the input end time of, for example, "A" and the input start of the "B" corresponds to t1. The difference between the input end time of "B" and the input start of the "C" corresponds to t2. When the difference between the input end time of a character and the input start time of the next character is, for example, less than three seconds, it is determined that the strokes for the characters belong to the same group (it is estimated that characters are input around the same time). More specifically, when the time differences t1 and t2 are less than three seconds, the characters "ABC" are determined to be input around the same time and the strokes for "ABC" are classified as, for example, group 1. When the difference t3 between the input end time of "C" and the input start of the "D" is equal to or greater than three seconds, the strokes for the character "D" is classified into another group, for example, group 2. When the difference between the input end time of "D" and the input start of the "E", and the difference between the input end time of "E" and the input start time of "F" are both less than three seconds, the strokes for the characters starting from "D", that is, "DEF" are classified as group 2.

As classifications are made as described above, it is determined whether the classifications are made with respect to all the IDs of the input display boards 10(1) to 10(3) (in step F283). When it is determined that the classifications have not yet been made with respect to all the IDs of the input display boards 10(1) to 10(3) (step F283: NO), flow returns to step F281 to select an ID of another the input display boards 10(2) or 10(3) and sequentially to make the classifications of the strokes.

An ID of another input display board 10(2) or 10(3) is then selected based on the data packet for the first strokes input in the display input boards 10(2) and 10(3) that includes the earlier input start time, so that the ID of the input display board 10(2) is then selected, as will be understood by the illustration in FIG. 29.

For example, when the first character "1" is started to be input in the input display board 10(2), before three seconds elapses from the input end time of the last character of group 1, "C" input in the input display board 10(1), the stroke for the character "1" is classified as group 1. When the time difference t4 is less than three seconds, the stroke for the character "2" is classified as group 1.

Similarly, when the difference t5 between the input start time of the first character "V" input in the input display board 10(3) and the last character of group 1, "2" input in the input display board 10(2), is less than three seconds, the stroke for the character "V" is classified as group 1. When the difference t6 is less than three seconds, the strokes for character "W" are classified as group 1.

The difference between the input start time of the character "D" of group 2 input in the input display board 10(1), and the input end time of the last character "W" of group 1 input in the input display board 10(3), corresponds to t7. When it is determined that difference t7 is equal to or greater than three seconds, the strokes for the characters "DEF" input in the input display board 10(1) are classified as group 2 in the determination made in connection with the input display board 10(3). Even when the strokes for the characters "DEF" are classified as group 2 in the determination made in the single input display board 10(1), the strokes for "DEF" are possibly classified as group 1 in the determination in connection with the input display board 10(3) if the time difference t7 is less than three seconds.

When the classifications are made as described above with respect to all IDs of the input display boards 10(1) to 10(3) (step F283: YES), the synchronization display controller 350 determines whether a stepping display is requested from any of the input display boards 10(1) to 10(3) (in step F284). When the synchronization display controller 350 determines that the stepping display is requested from any of the input display boards 10(1) to 10(3) (step F284: YES), data of the strokes subjected to the classifications are displayed step by step, according to groups in the corresponding display areas, every time the stepping display is requested (in step F285).

Figure 30A:
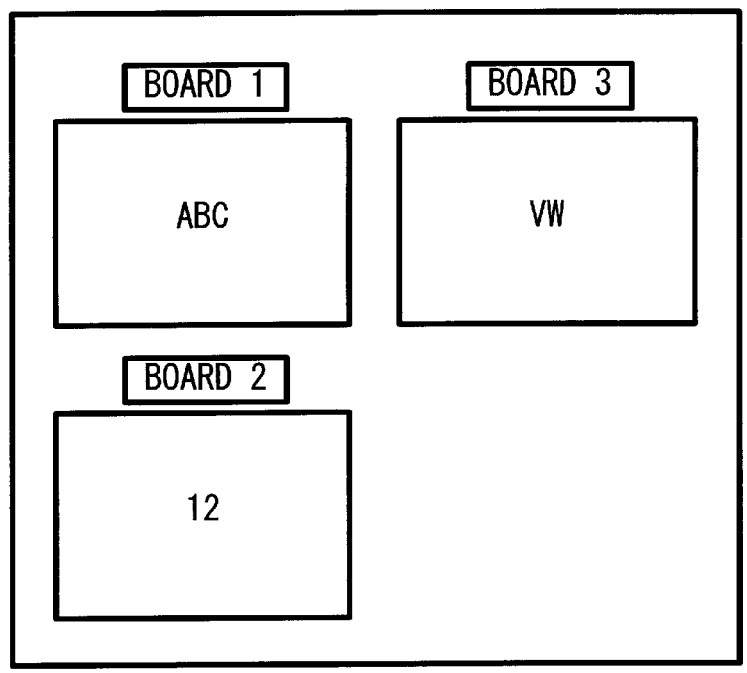
FIGS. 30A and 30B are schematics illustrating examples of display on the display panel when the playback processes are performed.
Figure 30B:
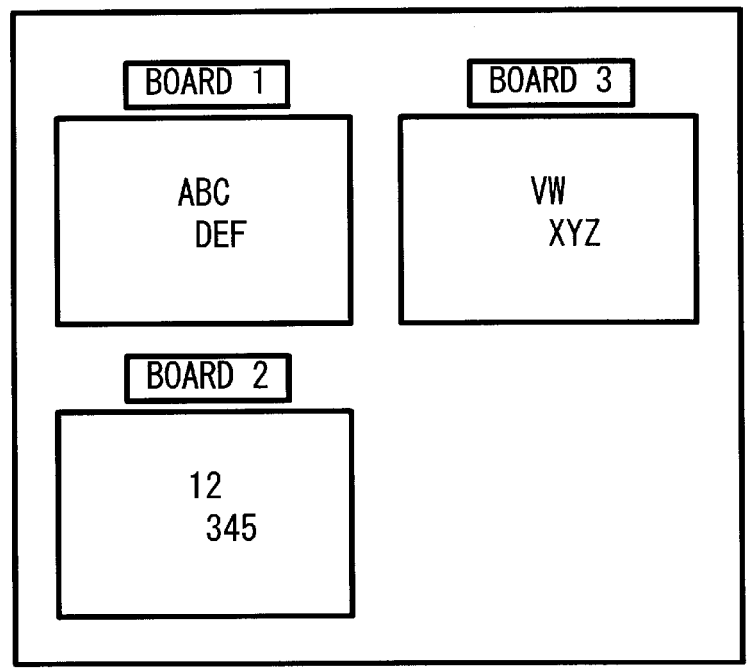

For example, as shown in FIG. 30A, when the stepping display is requested, the data of strokes classified as group 1, that is, "ABC", "12", and "VW" are displayed first in the corresponding display areas. Then, the data of strokes classified as group 2, that is, "DEF", "345", and "XYZ" are displayed, as shown in FIG. 30B, in the corresponding display areas, in addition to the characters displayed previously. The stepping display processes are repeatedly conducted until the data of any stroke that has not yet been displayed does not exist (step F286: NO) or the display process finishes (step F287: YES). In FIGS. 30A and 30B, the indication of the input start time is omitted.

In the above-described eighth exemplary embodiment, the characters/graphics estimated to be input approximately at the same time are displayed step by step, based on the user's operation to designate the playback mode for the stepping display. However, the characters/graphics estimated to be input approximately at the same time may be automatically displayed step by step, every time a predetermined period of time elapses once the user designates the playback mode for the stepping display.

In the above-described eighth exemplary embodiment, the stroke data input unit 310 of the input display board 10 transmits to the display unit 120 the coordinate data for characters/graphics obtained by the input board unit 110, by attaching the ID of the input display board 10 to the coordinate data. The synchronization display controller 350 of the display unit 120 displays the characters/graphics based on the coordinate data received through the receiver 330, and the ID of the input display board 10, in respective areas of the display panel 120a.

When the conference is held between people in the remotely located conference rooms A, B, and C, each of the participants may easily understand in which input display boards 10(1) to 10(3) the contents displayed in the display panel 120a are input, by referring to the input display board IDs indicated relative to the display areas corresponding to the input display boards 10(1) to 10(3) on the display panel 120a. Therefore, even when the conference is held between people in the remotely located rooms, the above-described structures develop the mutual understanding between the participants. In this case, the display area in the display panel 120a is divided, according to types or differences of the IDs transmitted from each of the input display boards 10(1) to 10(3). That is, the display area in the display panel 120a is divided according to the number of the input display boards 10 that actually transmit the coordinate data. The display area is not provided in the display panel 120a for the input display board 10 that does not transmit the coordinate data, even when the input display board 10 is connected to the display unit 120, through the communication line 13. Thus, the display area in the display panel 120a is effectively used.

Further, in the above-described eighth exemplary embodiment, the stroke data input unit 310 sequentially transmits the data, every time the coordinate data is obtained. The synchronization display controller 350 displays the characters/graphics based on the data sequentially transmitted from the stroke data input unit 310 on the display panel 120a in real time. Since the characters/graphics, manually input in the input display board 10, may be displayed in the display panel 120a substantially in real time, the response of the display unit 120 to the manual input is favorable.

In the above-described eighth exemplary embodiment, the characters are displayed synchronously according to the groups classifying strokes for the characters. However, characters/graphics may be displayed synchronously according to strokes thereof. More specifically, the synchronization display controller 350 may be structured to display during the playback processes, each of strokes based on the relative time (time difference between a reference time and the input start time of each of the strokes). Thus, the characters/graphics may be displayed at a timing similar to the timing at which characters/graphics are manually input by a participant during the conference (that is, at a timing similar to the timing at which characters/graphics are displayed in real time, as described above).

In the eighth exemplary embodiment, when discussions or opinions raised in the conference needs to be reviewed during the intermission or after the conference is finished, the synchronization display controller 350 reads out the data stored in the stroke data storage unit 340 and performs the playback processes to display the discussions or opinions raised in the conference again in the display panel 120a.

The stroke data input unit 310 transmits the coordinate data to which the input start time data is attached. The synchronization display controller 350 estimates the input time of each of the strokes by reading the input start time data attached to the coordinate data. The synchronization display controller 350 displays, during the playback processes, characters/graphics estimated to be input approximately at the same time in the input display boards 10(1) to 10(3). Therefore, the participants may easily understand how the conference proceeds by seeing the characters/graphics displayed again by the playback processes in the display panel 120a. Also, the input start time of character/graphics is displayed in the display panel 120a. Accordingly, the participants can clearly understand how much time has elapsed since the character/graphics are started to be manually input.

The pen 15 used to manually input characters/graphics in the input board unit 110 may also transmit the ID thereof to the stroke data input unit 310. Upon the reception of the ID of the pen 15, the stroke data input unit 310 transmits the ID of the pen 15 to the display unit 120. The synchronization display controller 350 determines the colors to be used in the display panel 120 according to the attributes of the pen 15, so that the display on the display panel 120a may be controlled in various manners.

Figure 31:
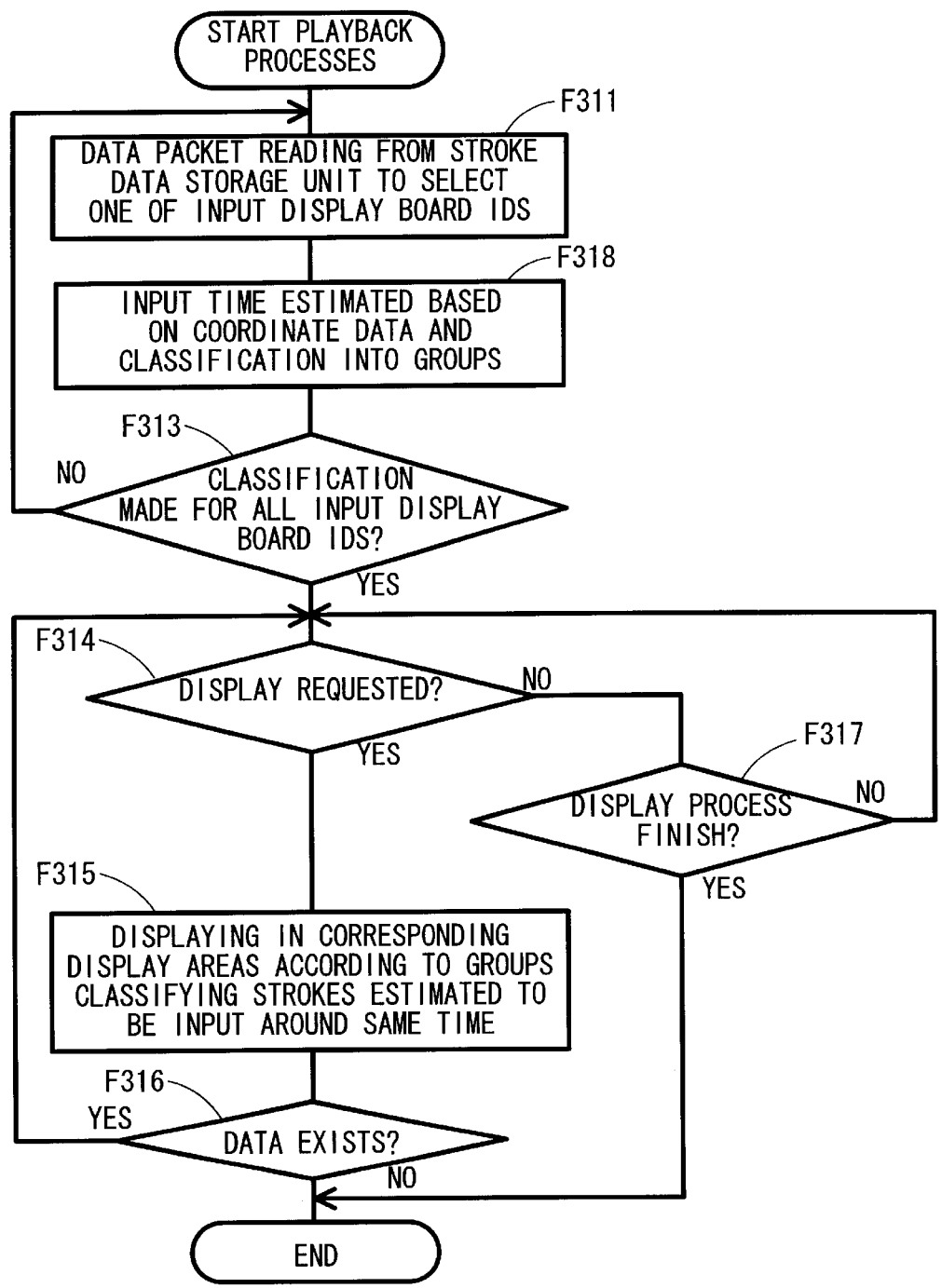
FIG. 31 is a flowchart illustrating playback processes performed by the display unit.
Figure 32:
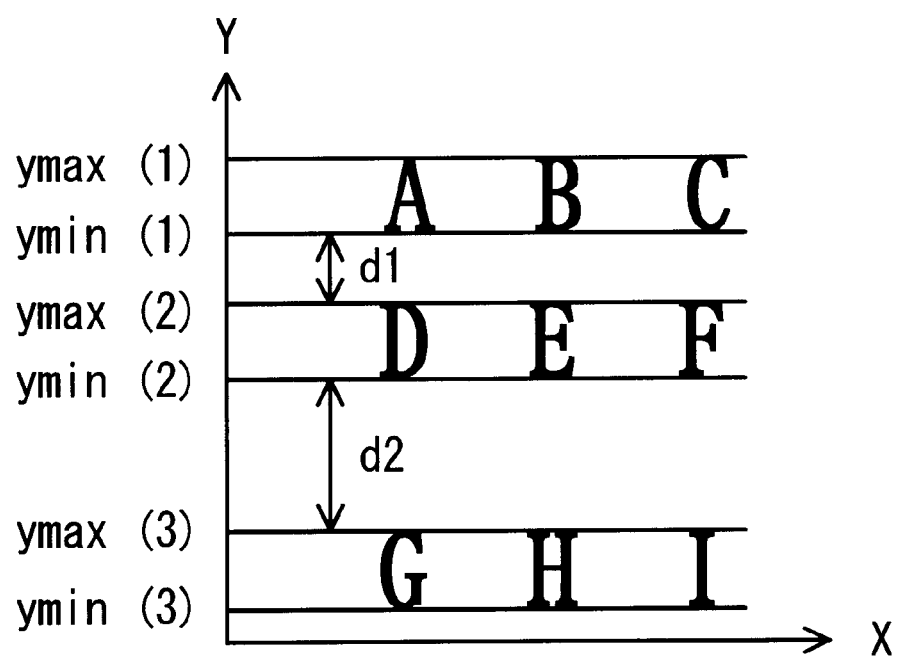
FIG. 32 is a schematic illustrating X and Y positions of characters "ABC", "DEF", and "GHI" indicated in an X, Y coordinate system.

Referring to FIGS. 31 and 32, a ninth exemplary embodiment of the invention will be described below. Aspects different from the eighth exemplary embodiment will be described. Structures according to the ninth exemplary embodiment are basically the same as those according to the eighth exemplary embodiment, except that a process performed by the synchronization display controller 350 is different. In the eighth exemplary embodiment, step F282 in FIG. 28 is provided in which input time is estimated based on the input start time data included in the data packet. In the ninth exemplary embodiment, step F318 in FIG. 31 is provided in which the input time is estimated based on the coordinate data.

For example, positions of characters "ABCDEFGHI" input in the input display board 10(1) are indicated in the XY system as shown in FIG. 32. In FIG. 32, the ymin(1) and ymax(1) indicate the minimum and maximum values of the Y coordinates of characters "ABC", respectively. The ymin(2) and ymax(2) indicate the minimum and maximum values of the Y coordinates of characters "DEF", respectively. The ymin(3) and ymax(3) indicate the minimum and maximum values of the Y coordinates of characters "GHI", respectively.

The characters "DEF" are input on a new line below the line where "ABC" are input, so that the equation ymax(2)<ymin(1) holds true. The characters "GHI" are input on a new line below the line where "DEF" are input, so that the equation ymax(3)<ymin(2) holds true. The differences d1 and d2 in the Y coordinates are obtained by ymin(1)−ymax(2) and ymin(2)−ymax(3), respectively. The difference d1 is relatively small, so that it is estimated that the characters "ABC" and "DEF" are input around the same time, even though the characters "DEF" are not input continuously next to the characters "ABC", but on the new line. To the contrary, the difference d2 is relatively large, so that it is not estimated that the characters "DEF" and "GHI" are input around the same time.

To determine whether the difference in the Y coordinates is large or small, which is used to determine whether the characters are input around the same time, it is preferable to conduct a statistical analysis, such as to calculate the differences in the Y coordinates for all input characters and to calculate the averages of all the differences in the Y coordinates obtained by all the input characters. Even when the difference in the Y coordinates is determined to be the same as d1, it may be estimated that characters input on a new line are input at a different time from the time when the characters on the previous line are input, if it is already know that only a single line is used for characters to be input around the same time.

In the above-described ninth exemplary embodiment, the synchronization display controller 350 estimates the input time of the characters based on the coordinate data for each of strokes for the characters. Accordingly, the characters/graphics estimated to be input approximately at the same time, are displayed at the same time. Similar to the playback processes described in the eighth exemplary embodiment, it is easily understood how the conference proceeds in the input display board 10 according to the ninth exemplary embodiment.

Figure 33:
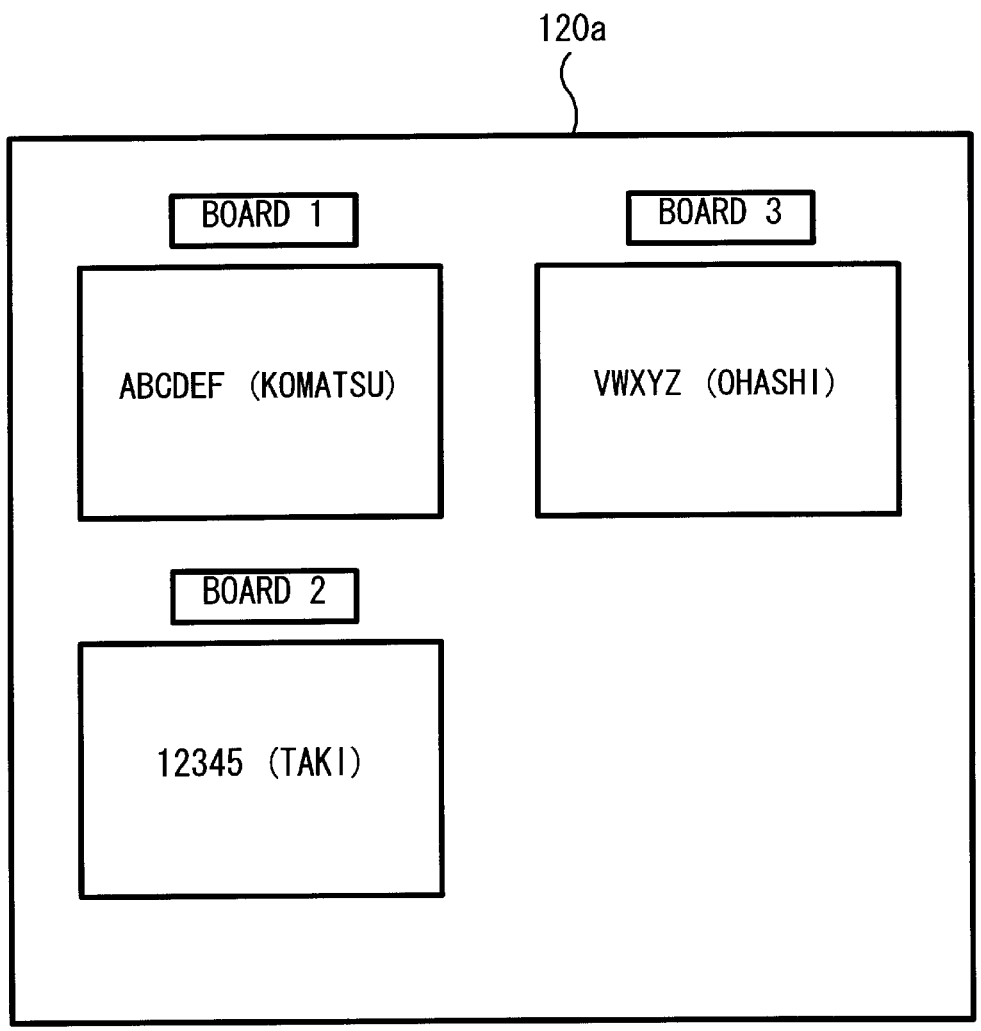
FIG. 33 is a schematic illustrating displaying examples on the display panel according to a tenth exemplary embodiment.

Referring to FIG. 33, a tenth exemplary embodiment of the invention will be described below. In the tenth exemplary embodiment, the input board unit 110 includes an information input unit that inputs and designates information that the user would like to display in the display panel 120a, for example, a user's name. A hardware key to input and designate such information that is displayed in the display panel 120a may be provided on the control panel 18. A software key to input and designate such information that is displayed in the display panel 120a may be provided on the writing panel 14. For example, the user's name may be input in the input board unit 110, using the hardware or software key.

Thereafter, the stroke data input unit 310 transmits to the display unit 120 the data for the user's name and the input display board ID incorporated into the data packet. The synchronization display controller 350 draws the name data from the data packet and displays the designated name at the end of the relative content displayed in the display panel 120a. For example, as shown in FIG. 33, names of users who are using the input display boards 10(1) to 10(3), for example, "KOMATSU", "TAKI", and "OSHIMA" are indicated following the displayed contents, "ABCDEF", "12345", and "VWXYZ", respectively, in the display areas corresponding to the input display boards 10(1) to 10(3).

In the above-described tenth exemplary embodiment, when the user inputs the name thereof in the input board unit 110, the data for the name is transmitted to the display unit 120, together with the input display board ID. The synchronization display controller 350 draws out the data for the name and displays the name together with the content to be displayed in the display panel 120a. With such structures, for example, an opinion may be displayed in the display panel 120a, together with a name of a person who inputs the opinion during the conference. Consequently, the participants of the conference may easily understand who inputs the opinion displayed in the display panel 120a.

Figure 34:
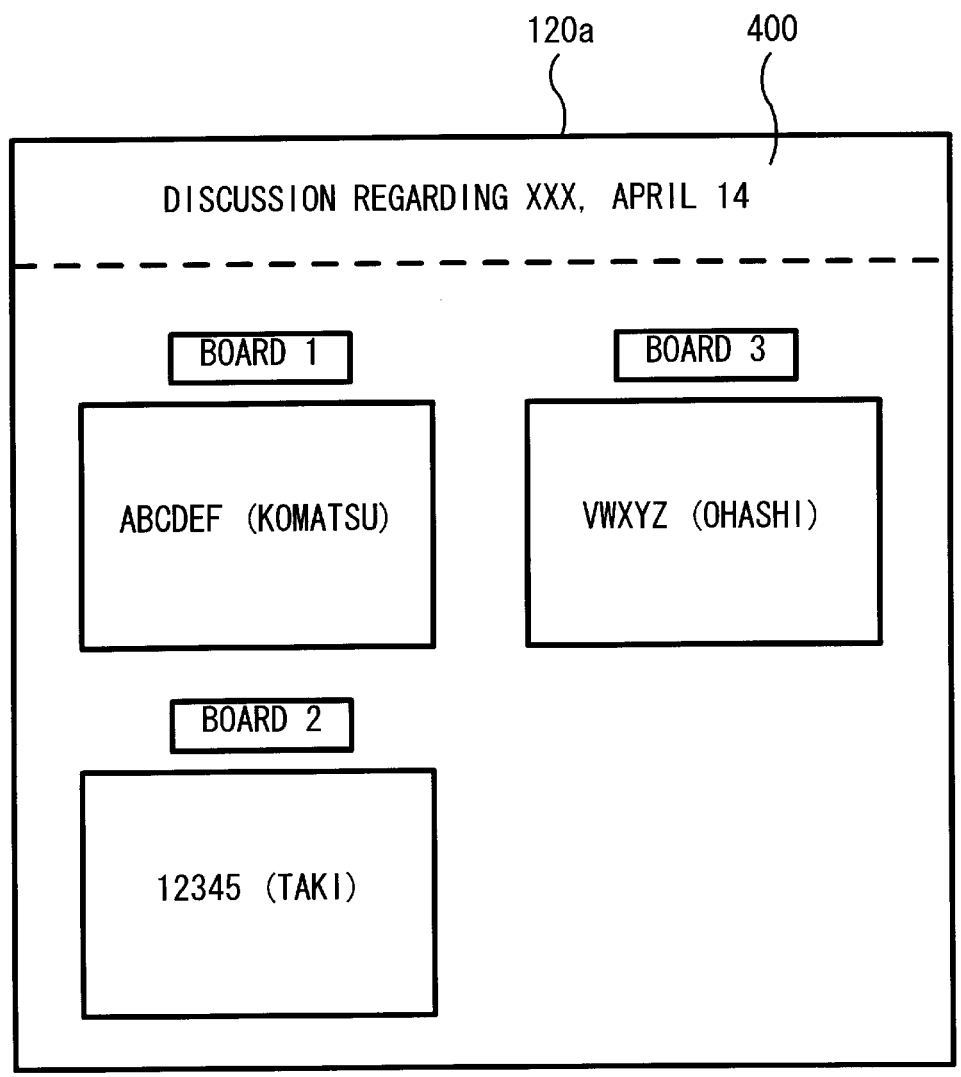
FIG. 34 is a schematic illustrating displaying examples on the display panel according to an eleventh exemplary embodiment.

Referring to FIG. 34, an eleventh exemplary embodiment of the invention will be described below. In the eleventh exemplary embodiment, the input board unit 110 may include a software key to input information that a user would like to display in a specific display area 400 of the display panel 120a, for example, a title or date of a conference. The specific display area 400 is provided separately to the display areas corresponding to the input display boards 10.

When operations to input and designate the information to be displayed in the specific display area 400, are performed, data for the information, such as the title or date, input in the input board unit 110, is transmitted to the display unit 120 by incorporating the data into the data packet. The synchronization display controller 350 draws the data for such information and displays the designated information in the specific display area 400 of the display panel 120a. For example, as shown in FIG. 34, a title, "DISCUSSION REGARDING XXX" and a date, "April 14" are displayed in the specific display area 400 of the display panel 120a (for example, at the top of the display panel 120a).

In the above-described eleventh exemplary embodiment, a title and a date of a conference may be displayed in an area separated from the display areas corresponding to the input display boards 10, for example, at the top of the display panel 120a.

While the invention has been described with reference to the eighth through the eleventh exemplary embodiments, it is to be understood that the invention is not restricted to the particular forms shown in the foregoing eighth through the eleventh exemplary embodiments. Various modifications and alterations can be made thereto without departing from the scope of the invention.

For example, the input display boards 10(1) to 10(3) may be connected in various manners other than a manner described in the eighth through the eleventh exemplary embodiments. For example, a plurality of the input display boards 10 may be provided in one conference room for each of the participants, so that each participant may join the conference while seeing the display panel 120a of the input display board 10 disposed close to each participant. The communication line 13 is not limited to a public telephone line, but a local-area network (LAN) or a communications protocol may be used.

Figure 35:
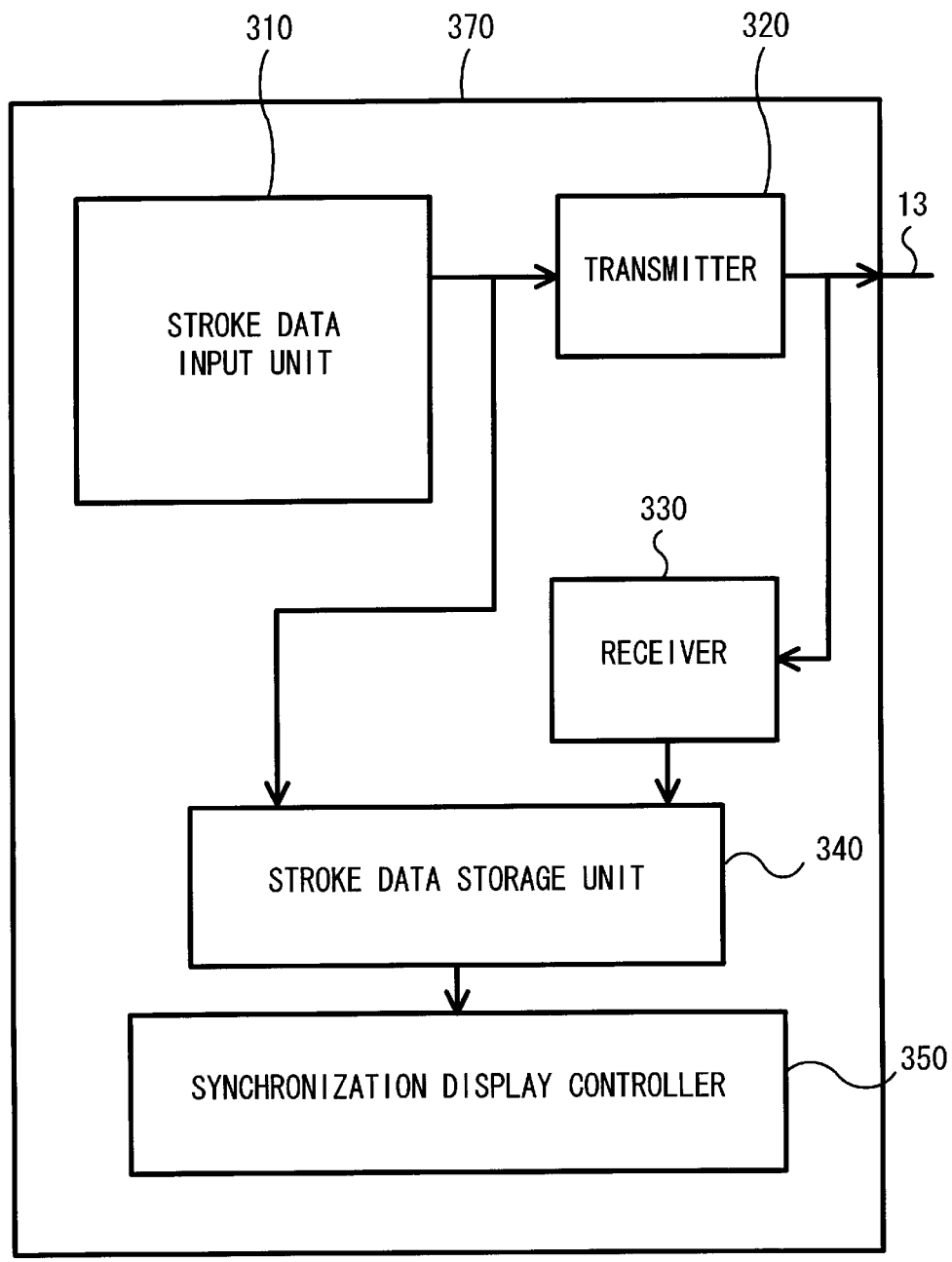
FIG. 35 is a block diagram illustrating an electrical configuration of an input display board according to a modification of the eighth exemplary embodiment of the invention.
Figure 36:
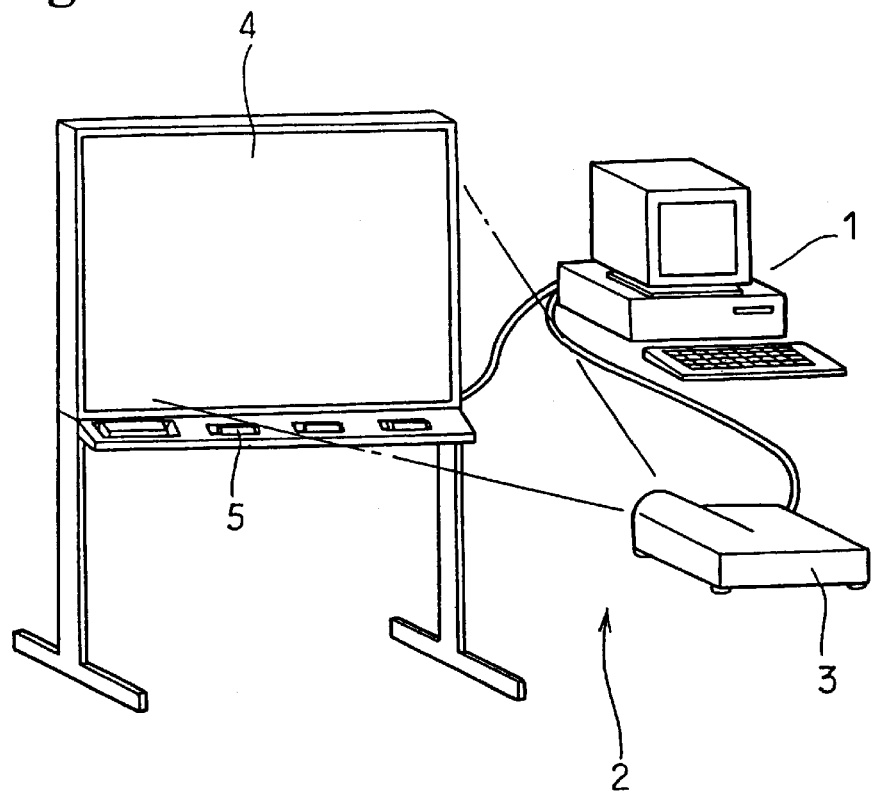
FIG. 36 is a perspective view of a conventional manually input data display system.

When the input board unit 110 and display unit 120 are integrally formed as described in the eighth exemplary embodiment, data output from the stroke data input unit 310 may be directly stored in the stroke data storage unit 340, as shown in a modification of the eighth exemplary embodiment in FIG. 35. Data transmitted from other input display board 10 may be stored in the stroke data storage unit 340, through the receiver 330. In this case, an input display board 370 may be provided in which functions of the stroke data input unit 310 and the synchronization display controller 350 are executed by a CPU.

The input board unit 110 and the display unit 120 may be provided separately. Functions of the display unit 120 may be executed by a personal computer. One display unit 120 having a large-size display area may be provided for a plurality of the input board units 110. In this case, the display area is shared. Characters/graphics written by each of participants of the conference may be displayed in the shared display area. The participants may see the shared display area during the conference. Further, constructions such that the number of the input board units 110 is greater than that of the display units 120, or the number of the display units 120 is greater than that of the input board units 110, may be employed. When a conference is held between people in remotely located rooms as described in the eighth exemplary embodiment, each room may be provided with a display screen if there are a plurality of participants in one room.

The display areas in the display panel 120a may be provided for the input display boards 10 that actually transmit the data, or may be provided for all of the input display boards 10 that are connected and are enabled for communications.

The input start time may be estimated using a combination of the input start time data as described in the eighth exemplary embodiment and the coordinate data as described in the ninth exemplary embodiment.

Further, the coordinate data may be transmitted every time the coordinate data for one stroke is obtained. Instead, by providing, for example, a transmission switch, the coordinate data for strokes of a set of characters may be transmitted at a time when the transmission switch is operated.

When it is determined by identifying the attributes (ID) of the pen 15 that characters/graphics are manually input in one input display board 10 using the pen 15 having specific attributes, such characters/graphics may be overwritten and displayed in the areas corresponding to the other input display boards 10. A software key may be provided to permit overwriting, similar to the software key provided in the tenth exemplary embodiment to input and designate the information, such as the user's name. The overwriting may be permitted when the software key is operated.

In the eighth exemplary embodiment, as a user designates the playback mode to execute the stepping display, strokes may be sequentially displayed according to the input display boards 10, every time the strokes input in one of the input display boards 10 have been classified.

The communication period may be terminated by a user's operation.

Without setting the communication period of steps E261 through E265, the display unit 120 may sequentially display the received data in the display panel 120a. In this case, the size of the display areas for one input display board 10 may be predetermined. When the display areas become insufficient, a window overlapping to one display area may be provided.

In the ninth exemplary embodiment, determination as to whether a stroke is input on a new line may be made by a great reduction in the X coordinates.

What is claimed is:

1. A manually input data display system, comprising:
   a plurality of coordinate data input devices and at least one display device, each of the coordinate data input devices including:
      a coordinate data acquisition unit that obtains images manually input from the coordinate data input devices as coordinate data;
      a coordinate controller that controls processing of the coordinate data obtained by the coordinate data acquisition unit; and
      a transmitter that transmits the coordinate data; and
   the display device including:
      a receiver that receives the coordinate data transmitted from the plurality of the coordinate data input devices;
      a display controller that controls processing of the coordinate data received through the receiver; and
      a display unit that displays the manually input images based on the coordinate data;
         wherein the display controller of the display device divides a display area of the display unit into a plurality of individual display areas corresponding to the plurality of coordinate data input devices, and a selective display area that selectively displays the images displayed in the individual display areas; and
   wherein each of the coordinate data input devices further comprises:
      a temporary storage device that temporarily stores the coordinate data obtained by the coordinate acquisition unit; and
      an erasing unit that performs an erasing operation to erase the coordinate data stored in the temporary storage device;
      wherein the coordinate controller of each of the coordinate input devices transmits the coordinate data stored in the temporary storage device to the display device, through the transmitter, when the images manually input from the coordinate data input devices are entirely erased by the erasing unit.

2. The manually input data display system according to claim 1, wherein the coordinate controller of each of the coordinate data input devices transmits the coordinate data obtained by the coordinate data acquisition unit, with an identification information of each of the coordinate data input devices attached to the coordinate data; and
   wherein the display controller of the display device identifies the identification information attached to the coordinate data received through the receiver, and displays the images input in each of the coordinate data input devices on the corresponding individual display areas, based on the coordinate data, and when it is determined that the images displayed in the individual display areas satisfy a predetermined condition, the display controller of the display device shifts the images displayed in the individual display areas to the selective display area.

3. The manually input data display system according to claim 2, wherein the display controller of the display device determines, based on the identification information attached to the coordinate data, whether the images corresponding to the coordinate data are to be displayed in the display unit.

4. The manually input data display system according to claim 2, wherein each of the coordinate data input devices further comprises a designation unit that designates the images displayed in any of the individual display areas, and wherein when the display controller of the display device receives data designating the images selected by the designation unit from any of the coordinate data input devices, through the receiver, the display controller of the display device determines that the designated images displayed in the individual display areas satisfy the predetermined condition.

5. The manually input data display system according to claim 2, wherein each of the coordinate data input devices further comprises a designation unit that designates the images displayed in any of the individual display areas, and wherein when the display controller of the display device receives data designating the images selected by the designation unit of at least one of the coordinate data input devices, through the receiver, the display controller determines that the images displayed in one of the individual display areas, which is designated the most, satisfy the predetermined condition.

6. The manually input data display system according to claim 2, wherein when the images displayed in the individual display areas are selectively shifted to the selective display area, the display controller of the display device displays the identification information of the coordinate input devices corresponding to the individual display areas, together with the images to be shifted to the selective display area.

7. The manually input data display system according to claim 6, wherein each of the coordinate data input devices further comprises an information input unit that inputs displayable information by an operation of the user, and wherein the coordinate controller of each of the coordinate data input devices adds the displayable information input by the information input unit, to the identification information.

8. The manually input data display system according to claim 2, wherein when the images displayed in the individual display areas are selectively shifted to the selective display area, the display controller of the display device displays serial numbers together with the images to be shifted to the selective display area.

9. The manually input data display system according to claim 2, wherein each of the coordinate data input devices further comprises a heading designation unit that designates a heading for the images to be displayed in the selective display area, and wherein as the display controller of the display device receives data designating the heading designated by the heading designation unit, through the receiver, the display controller displays the heading together with the images when the images displayed in the individual display areas are selectively shifted to the selective display area.

10. The manually input data display system according to claim 1, wherein the display controller of the display device predetermines a number of the individual display areas according to a number of the coordinate data input devices connected to the transmitter.

11. The manually input data display system according to claim 2, wherein the display controller of the display device determines a number of the individual display areas according to a number of the coordinate data input devices that actually transmit the coordinate data among the coordinate data input devices connected to the transmitter.

12. The manually input data display system according to claim 2, wherein the display controller of the display device stacks the individual display areas in the display unit, to overlap the individual display areas, and one of the individual display areas corresponding to one of the coordinate data input device that most recently transmits the coordinate data is placed on a top.

13. A manually input data display system, comprising:

a plurality of coordinate data input devices and at least one display device, each of the coordinate data input devices including:

a coordinate data acquisition unit that obtains images manually input from the coordinate data input devices as coordinate data;

a coordinate controller that controls processing of the coordinate data obtained by the coordinate data acquisition unit; and a transmitter that transmits the coordinate data; and the display device including:

a receiver that receives the coordinate data transmitted from the plurality of the coordinate data input devices;

a display controller that controls processing of the coordinate data received through the receiver; and a display unit that displays the manually input images based on the coordinate data;

wherein the coordinate controller of each of the coordinate data input devices transmits the coordinate data obtained by the coordinate data acquisition unit by attaching an identification information of each of the coordinate data input devices to the coordinate data;

wherein the display controller of the display device displays the images based on the coordinate data received through the receiver and the identification information attached to the coordinate data in the display unit; and wherein each of the coordinate data input devices further comprises:

a temporary storage device that temporarily stores the coordinate data obtained by the coordinate acquisition unit; and an erasing unit that performs an erasing operation to erase the coordinate data stored in the temporary storage device;

wherein the coordinate controller of each of the coordinate input devices transmits the coordinate data stored in the temporary storage device to the display device, through the transmitter, when the images manually input from the coordinate data input devices are entirely erased by the erasing unit.

14. The manually input data display system according to claim 13, wherein the display device further comprises a storage unit that stores the coordinate data in association with the identification information of one of the plurality of the coordinate data input devices from which the coordinate data was transmitted, and wherein the display controller of the display device stores in the storage unit the coordinate data in association with the identification information, reads the identification information in association with the coordinate data stored in the storage unit to divide a display area of the display unit into a plurality of areas, and displays the images input from the coordinate data input devices simultaneously in each of the divided areas of the display unit.

15. The manually input data display system according to claim 14, wherein the display controller of the display device further comprises an estimation unit that estimates whether the images corresponding to the coordinate data received through the receiver, are input approximately at a same time from the coordinate data input devices, and simultaneously displays the images estimated to be input approximately at the same time from the coordinate data input devices, based on a result of estimation by the estimation unit.

16. The manually input data display system according to claim 15, wherein the coordinate controller of each of the coordinate input devices transmits the coordinate data obtained by the coordinate data acquisition unit by attaching input time data for the images to the coordinate data, wherein the display controller of the display device stores in the storage unit the coordinate data attaching the input time data thereto and received through the receiver in association with the input time data, and wherein the estimation unit estimates an input time of the images corresponding to the coordinate data by reading the input time data in association with the coordinate data stored in the storage unit.

17. The manually input data display system according to claim 15, wherein the estimation unit estimates, based on an amount of change in at least one of X coordinate and Y coordinate of the coordinate data transmitted from each of the coordinate data input devices, the input time of the images corresponding to the coordinate data.

18. The manually input data display system according to claim 14, wherein the display controller of the display device sequentially displays the images estimated to be input approximately at the same time, in each of the areas of the display unit every time a display request is made.

19. The manually input data display system according to claim 13, wherein the display controller of the display device divides the display area of the display unit, according to variations of the identification information transmitted from each of the coordinate data input devices.

* * * * *